United States Patent
Seok

(10) Patent No.: US 9,985,739 B2
(45) Date of Patent: May 29, 2018

(54) RATE DETERMINATION IN HIGH EFFICIENCY WIRELESS LAN

(71) Applicant: NEWRACOM, INC., Irvine, CA (US)

(72) Inventor: Yongho Seok, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 105 days.

(21) Appl. No.: 14/828,356

(22) Filed: Aug. 17, 2015

(65) Prior Publication Data
US 2016/0050659 A1     Feb. 18, 2016

Related U.S. Application Data

(60) Provisional application No. 62/100,443, filed on Jan. 6, 2015.

(30) Foreign Application Priority Data

Aug. 18, 2014     (KR) .................. 10-2014-0106841

(51) Int. Cl.
    *H04L 1/00*    (2006.01)
    *H04L 1/16*    (2006.01)
    (Continued)

(52) U.S. Cl.
    CPC .......... *H04L 1/0003* (2013.01); *H04L 1/0015* (2013.01); *H04L 1/0031* (2013.01);
    (Continued)

(58) Field of Classification Search
    CPC ... H04L 1/0003; H04L 1/0031; H04L 1/1614; H04L 1/0015; H04L 1/1671;
    (Continued)

(56) References Cited

U.S. PATENT DOCUMENTS

2006/0280134 A1*  12/2006  Kwon ................ H04L 29/06
                                                    370/278
2011/0150004 A1*  6/2011  Denteneer .......... H04L 5/0023
                                                    370/476

(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks —Specific requirements, Part 11: Wireless LAN Medium Access Control (MAC) and Physical Layer (PHY) Specifications, Amendment 2: Sub 1 GHz License Exempt Operation," Mar. 2015.
LAN/MAN Standards Committee of the IEEE Computer Society, "IEEE Standard for Information technology—Telecommunications and information exchange between systems Local and metropolitan area networks —Specific requirements, Part 11: Wireless LAN Medium Access Control (MAC) and Physical Layer (PHY) Specifications, Amendment 4: Enhancements for Very High Throughput for Operation in Bands below 6 GHz," 2013.
LAN/MAN Standards Committee of the IEEE Computer Society, "IEEE Standard for Information technology—Telecommunications
(Continued)

*Primary Examiner* — Sai Aung
*Assistant Examiner* — Sharmin Chowdhury
(74) *Attorney, Agent, or Firm* — McDermott Will & Emery LLP

(57) ABSTRACT

The present invention relates to a method and apparatus for determining a transmission rate in a Wireless Local Area Network (WLAN). According to one aspect of the present invention, a method for receiving an uplink frame from a Station (STA) by an Access Point (AP) in a WLAN may be provided. The method may include transmitting to the STA a downlink frame eliciting the uplink frame, and receiving the uplink frame from the STA at a rate determined based on whether the type of the uplink frame is a single user type or a multi-user type.

18 Claims, 24 Drawing Sheets

(51) Int. Cl.
*H04W 84/12* (2009.01)
*H04W 88/02* (2009.01)
*H04W 88/08* (2009.01)
*H04B 7/0452* (2017.01)
*H04W 72/12* (2009.01)
*H04B 7/06* (2006.01)

(52) U.S. Cl.
CPC .......... *H04L 1/1614* (2013.01); *H04L 1/1671* (2013.01); *H04B 7/0452* (2013.01); *H04B 7/0669* (2013.01); *H04W 72/1289* (2013.01); *H04W 84/12* (2013.01); *H04W 88/02* (2013.01); *H04W 88/08* (2013.01)

(58) Field of Classification Search
CPC ............... H04B 7/0669; H04B 7/0452; H04W 72/1289; H04W 84/12; H04W 88/02; H04W 88/08
See application file for complete search history.

(56) References Cited

U.S. PATENT DOCUMENTS

2012/0155447 A1* 6/2012 Vermani ............... H04L 1/0003
370/338
2016/0014804 A1* 1/2016 Merlin .................. H04L 5/0044
370/329

OTHER PUBLICATIONS and information exchange between systems Local and metropolitan area networks—Specific requirements, Part 11: Wireless LAN Medium Access Control (MAC) and Physical Layer (PHY) Specifications," 2012.

* cited by examiner

| L-STF | L-LTF | L-SIG | HE-SIG-A | HE-STF | HE-LTF | HE-SIG-B | HE-LTF | HE-LTF | HE-LTF | HE-LTF | HE-SIG-C | PSDU(AP to STA6) |
| | | | | HE-STF | HE-LTF | HE-SIG-B | HE-LTF | HE-LTF | HE-LTF | HE-LTF | HE-SIG-C | PSDU(AP to STA5) |
| | | | | HE-STF | HE-LTF | HE-SIG-B | HE-LTF | HE-LTF | HE-LTF | HE-LTF | HE-SIG-C | PSDU(AP to STA3, STA4) |
| | | | | HE-STF | HE-LTF | HE-SIG-B | HE-LTF | HE-LTF | HE-LTF | HE-LTF | HE-SIG-C | PSDU(AP to STA1, STA2) |

| RTS PPDU (STA1 to AP) | CTS PPDU (AP to STA1, STA2, STA3, STA4) | DATA PPDU (STA4 to AP) | Block ACK PPDU (AP to STA4) |
| | | DATA PPDU (STA3 to AP) | Block ACK PPDU (AP to STA3) |
| | | DATA PPDU (STA2 to AP) | Block ACK PPDU (AP to STA2) |
| | | DATA PPDU (STA1 to AP) | Block ACK PPDU (AP to STA1) |

FIG. 15

| RTS PPDU (AP to STA1) | CTS PPDU (STA1 to AP) | DATA PPDU (AP to STA4) | DATA PPDU (AP to STA3) | DATA PPDU (AP to STA2) | DATA PPDU (AP to STA1) | Block ACK PPDU (STA4 to AP) | Block ACK PPDU (STA3 to AP) | Block ACK PPDU (STA2 to AP) | Block ACK PPDU (STA1 to AP) |

FIG. 16

| RTS PPDU (AP to STA1) | CTS PPDU (STA1 to AP) | DATA PPDU (AP to STA4) | Normal ACK PPDU (STA4 to AP) |
| | | DATA PPDU (AP to STA3) | Normal ACK PPDU (STA3 to AP) |
| | | DATA PPDU (AP to STA2) | Normal ACK PPDU (STA2 to AP) |
| | | DATA PPDU (AP to STA1) | Normal ACK PPDU (STA1 to AP) |

FIG. 19

| | |
|---|---|
| RTS PPDU (AP to STA1) | RTS PPDU (AP to STA5) |
| CTS PPDU (STA1 to AP) | CTS PPDU (STA5 to AP) |
| DATA PPDU (AP to STA1)-MCS_low Implicit Block ACK Req / DATA PPDU (AP to STA2)-MCS_low / DATA PPDU (AP to STA3)-MCS_high / DATA PPDU (AP to STA4)-MCS_high | DATA PPDU (AP to STA5)-MCS_high Implicit Block ACK Req / DATA PPDU (AP to STA6)-MCS_high / DATA PPDU (AP to STA7)-MCS_low / DATA PPDU (AP to STA8)-MCS_low |
| Block ACK PPDU (STA1 to AP) -MCS_low | Block ACK PPDU (STA5 to AP) -MCS_low |
| Block ACK Request PPDU (AP to STA2) -MCS_low | Block ACK Request PPDU (AP to STA6) -MCS_low |
| Block ACK PPDU (STA2 to AP) -MCS_low | Block ACK PPDU (STA6 to AP) -MCS_low |
| Block ACK Request PPDU (AP to STA3) -MCS_low | Block ACK Request PPDU (AP to STA7) -MCS_low |
| Block ACK PPDU (STA3 to AP) -MCS_low | Block ACK PPDU (STA7 to AP) -MCS_low |
| Block ACK Request PPDU (AP to STA4) -MCS_low | Block ACK Request PPDU (AP to STA8) -MCS_low |
| Block ACK PPDU (STA4 to AP) -MCS_low | Block ACK PPDU (STA8 to AP) -MCS_low |

FIG. 20

| RTS PPDU (AP to STA1) | RTS PPDU (AP to STA5) |
|---|---|
| CTS PPDU (STA1 to AP) | CTS PPDU (STA5 to AP) |

| DATA PPDU (AP to STA1) - MCS_low implicit Block ACK Req | DATA PPDU (AP to STA5) - MCS_high |
|---|---|
| DATA PPDU (AP to STA2) - MCS_low | DATA PPDU (AP to STA6) - MCS_high |
| DATA PPDU (AP to STA3) - MCS_low | DATA PPDU (AP to STA7) - MCS_low implicit Block ACK Req |
| DATA PPDU (AP to STA4) - MCS_low | DATA PPDU (AP to STA8) - MCS_low |

| Block ACK PPDU (STA1 to AP) - MCS_low | Block ACK PPDU (STA7 to AP) - MCS_low |
| Block ACK Request PPDU (AP to STA2) - MCS_low | Block ACK Request PPDU (AP to STA8) - MCS_low |
| Block ACK PPDU (STA2 to AP) - MCS_low | Block ACK PPDU (STA8 to AP) - MCS_low |
| Block ACK Request PPDU (AP to STA3) - MCS_high | Block ACK Request PPDU (AP to STA5) - MCS_high |
| Block ACK PPDU (STA3 to AP) - MCS_high | Block ACK PPDU (STA5 to AP) - MCS_high |
| Block ACK Request PPDU (AP to STA4) - MCS_high | Block ACK Request PPDU (AP to STA6) - MCS_high |
| Block ACK PPDU (STA4 to AP) - MCS_high | Block ACK PPDU (STA6 to AP) - MCS_high |

FIG. 21

| RTS PPDU (AP to STA1) | RTS PPDU (AP to STA5) |
|---|---|
| RTS PPDU (STA1 to AP) | RTS PPDU (STA5 to AP) |

| DATA PPDU (AP to STA8)-MCS_high implicit Block ACK Req |
| DATA PPDU (AP to STA7)-MCS_high implicit Block ACK Req |
| DATA PPDU (AP to STA6)-MCS_high implicit Block ACK Req |
| DATA PPDU (AP to STA5)-MCS_high implicit Block ACK Req |
| DATA PPDU (AP to STA4)-MCS_high implicit Block ACK Req |
| DATA PPDU (AP to STA3)-MCS_high implicit Block ACK Req |
| DATA PPDU (AP to STA2)-MCS_low implicit Block ACK Req |
| DATA PPDU (AP to STA1)-MCS_low implicit Block ACK Req |

| Block ACK PPDU(STA8 to AP)-MCS_low |
| Block ACK PPDU(STA7 to AP)-MCS_low |
| Block ACK PPDU(STA6 to AP)-MCS_low |
| Block ACK PPDU(STA5 to AP)-MCS_low |
| Block ACK PPDU(STA4 to AP)-MCS_low |
| Block ACK PPDU(STA3 to AP)-MCS_low |
| Block ACK PPDU(STA2 to AP)-MCS_low |
| Block ACK PPDU(STA1 to AP)-MCS_low |

FIG. 22

| Element ID | Length | HE Capabilities Info | Supported HE-MCS and Nss Set |

Supported HE-MCS and Nss Set:
| Rx HE-MCS Map | Rx Highest Supported Long GI Data Rate | Tx HE-MCS Map | Tx Highest Supported Long GI Data Rate |

Rx HE-MCS Map:
| Max HE-MCS For 1 SS | Max HE-MCS For 2 SS | Max HE-MCS For 3 SS | Max HE-MCS For 4 SS | Max HE-MCS For 5 SS | Max HE-MCS For 6 SS | Max HE-MCS For 7 SS | Max HE-MCS For 8 SS |

FIG. 23

| Element ID | Length | HE Capabilities Info | Supported HE-MCS and Nss Set |
|---|---|---|---|

Supported HE-MCS and Nss Set:

| Rx HE-MCS Map (for Uplink SU Tx) (or except for Uplink MU Tx) | Rx HE-MCS Map for Uplink MU Tx | Rx Highest Supported Long GI Data Rate | Tx HE-MCS Map | Tx Highest Supported Long GI Data Rate |
|---|---|---|---|---|

Rx HE-MCS Map:

| Max HE-MCS For 1 SS | Max HE-MCS For 2 SS | Max HE-MCS For 3 SS | Max HE-MCS For 4 SS | Max HE-MCS For 5 SS | Max HE-MCS For 6 SS | Max HE-MCS For 7 SS | Max HE-MCS For 8 SS |
|---|---|---|---|---|---|---|---|

RATE DETERMINATION IN HIGH EFFICIENCY WIRELESS LAN

CROSS-REFERENCE TO RELATED APPLICATIONS

This application claims the benefit of Korean Patent Application No. 10-2014-0106841, filed on Aug. 18, 2014, which is hereby incorporated by reference as if fully set forth herein. This application claims the benefit of U.S. Provisional Application No. 62/100,443, filed on Jan. 6, 2015, which is hereby incorporated by reference as if fully set forth herein.

BACKGROUND OF THE INVENTION

Field of the Invention

The present invention relates to a Wireless Local Area Network (WLAN), and more particularly, to a mechanism for determining a transmission rate in a High Efficiency WLAN (HEW), a transmitting method, receiving method, transmitting apparatus, receiving apparatus, and software using the mechanism, and a recording medium that stores the software.

Discussion of the Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

SUMMARY OF THE INVENTION

Objects of the present invention is to provide a method and apparatus for determining a transmission rate based on a different parameter according to the type of a frame transmitted in a High Efficiency WLAN (HEW).

The objects of the present invention are not limited to the foregoing descriptions, and additional objects will become apparent to those having ordinary skill in the pertinent art to the present invention based upon the following descriptions.

In an aspect of the present invention, a method for receiving an uplink frame from a Station (STA) by an Access Point (AP) in a WLAN may be provided. The method may include transmitting a downlink frame eliciting the uplink frame to the STA, and receiving the uplink frame from the STA, the uplink frame having a rate determined based on whether the type of the uplink frame is a single user type or a multi-user type.

In another aspect of the present invention, a method for transmitting an uplink frame to an AP by an STA in a WLAN may be provided. The method may include receiving a downlink frame eliciting the uplink frame from the AP, and transmitting the uplink frame to the AP at a rate determined based on whether the type of the uplink frame is a single user type or a multi-user type.

In another aspect of the present invention, an AP apparatus for receiving an uplink frame from an STA in a WLAN may be provided. The AP apparatus may include a baseband processor, a Radio Frequency (RF) transceiver, a memory, etc. The baseband processor may be configured to transmit a downlink frame eliciting the uplink frame to the STA using the RF transceiver, and to receive the uplink frame from the STA, the uplink frame having a rate determined based on whether the type of the uplink frame is a single user type or a multi-user type, using the RF transceiver.

In another aspect of the present invention, an STA apparatus for transmitting an uplink frame to an AP in a WLAN may be provided. The STA apparatus may include a baseband processor, an RF transceiver, a memory, etc. The baseband processor may be configured to receive a downlink frame eliciting the uplink frame from the AP using the RF transceiver, and to transmit the uplink frame to the AP at a rate determined based on whether the type of the uplink frame is a single user type or a multi-user type, using the RF transceiver.

In another aspect of the present invention, a software or computer-readable medium having instructions executable for an AP apparatus to receive an uplink frame from an STA in a WLAN may be provided. The executable instructions may operate the AP apparatus to transmit a downlink frame eliciting the uplink frame to the STA, and to receive the uplink frame from the STA, the uplink frame having a rate determined based on whether the type of the uplink frame is a single user type or a multi-user type.

In another aspect of the present invention, a software or computer-readable medium having instructions executable for an STA apparatus to transmit an uplink frame to an AP in a WLAN may be provided. The executable instructions may operate the STA apparatus to receive a downlink frame eliciting the uplink frame from the AP, and to transmit the uplink frame to the AP at a rate determined based on whether the type of the uplink frame is a single user type or a multi-user type.

It is to be understood that both the foregoing summarized features are exemplary aspects of the following detailed description of the present invention without limiting the scope of the present invention.

According to the present invention, a method and apparatus for determining a transmission rate based on different parameters according to the type of a frame transmitted in a High Efficiency WLAN (HEW) can be provided.

The advantages of the present invention are not limited to the foregoing descriptions, and additional advantages will become apparent to those having ordinary skill in the pertinent art to the present invention based upon the following descriptions.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 depicts an exemplary High Efficiency (HE) Physical layer Protocol Data Unit (PPDU) frame format according to the present invention;

FIG. 10 depicts the starting and ending points of an High Efficiency Long Training Field (HE-LTF) field in a HE PPDU frame format according to the present invention;

FIG. 11 depicts a High Efficiency SIGnal B (HE-SIG-B) field and a High Efficiency SIGnal C (HE-SIG-C) field in the HE PPDU frame format according to the present invention;

FIG. 12 depicts another exemplary HE PPDU frame format according to the present invention;

FIG. 13 depicts an exemplary block ACKnowledgement (ACK) procedure in response to an Uplink (UL) Multi-User (MU) transmission according to the present invention;

FIG. 15 depicts an exemplary ACK procedure performed in response to a DL MU transmission according to the present invention;

FIG. 16 depicts another exemplary ACK procedure performed in response to a DL MU transmission according to the present invention;

FIG. 19 depicts an exemplary rate selection for response frames according to the present invention;

FIG. 20 depicts another exemplary rate selection for response frames according to the present invention;

FIG. 21 depicts another exemplary rate selection for response frames according to the present invention;

FIGS. 22 and 23 illustrate formats of a HE Capabilities element according to the present invention.

DETAILED DESCRIPTION OF THE INVENTION

Figure 1:
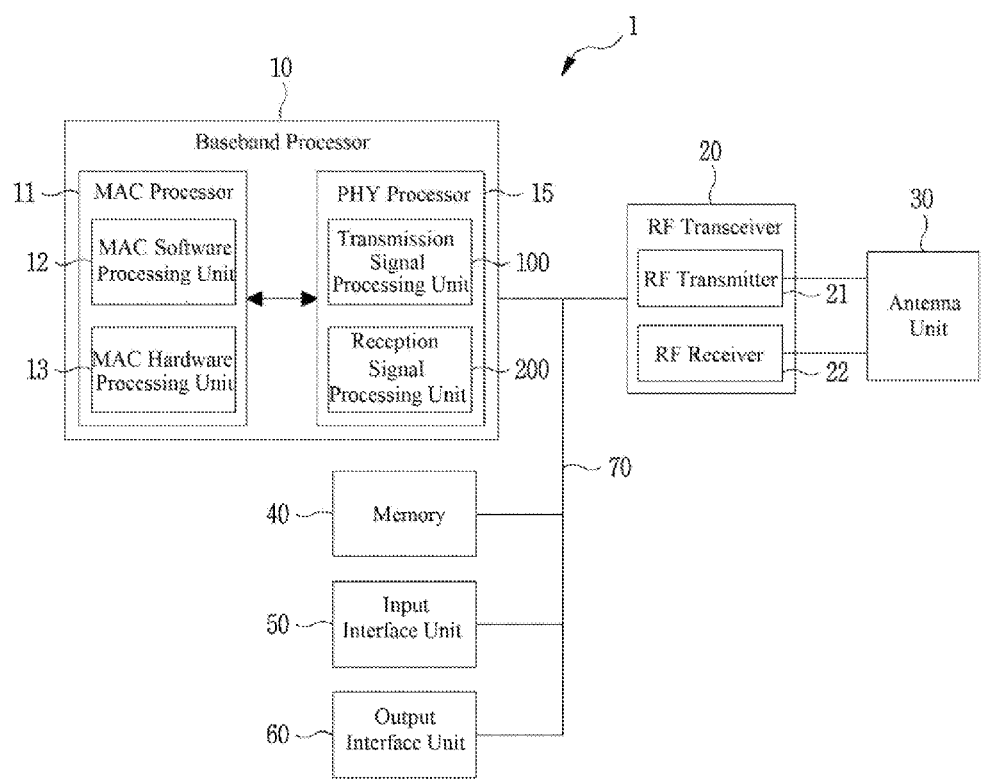
FIG. 1 is a block diagram of a Wireless Local Area Network (WLAN) device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a Wireless Local Area network (WLAN), a Basic Service Set (BSS) includes a plurality of WLAN devices. A WLAN device may include a Medium Access Control (MAC) layer and a PHYsical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STA and non-AP STA may be each referred to as a STA or may be collectively referred to as STAs. However, for ease of description herein, only the non-AP STAs may be referred to herein as the STAs.

FIG. 1 is a block diagram of a WLAN device.

Referring to FIG. 1, a WLAN device 1 includes a baseband processor 10, a Radio Frequency (RF) transceiver 20, an antenna unit 30, a memory 40, an input interface unit 50, an output interface unit 60, and a bus 70.

The baseband processor 10 may be simply referred to as a processor, performs baseband signal processing described in the present specification, and includes a MAC processor (or MAC entity) 11 and a PHY processor (or PHY entity) 15.

In an embodiment of the present invention, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer as hardware (hereinafter referred to as 'MAC hardware'). However, the MAC processor 11 is not limited to the foregoing implementation examples.

The PHY processor 15 includes a transmitting (TX) signal processing unit 100 and a receiving (RX) signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple input Multiple Output (MIMO) or Multi-User MIMO (MU-MIMO) is used, the antenna unit 30 may include a plurality of antennas.

Figure 2:
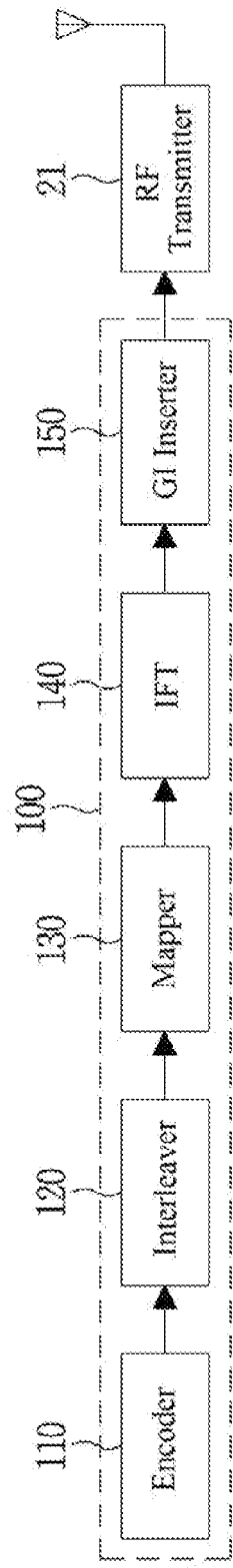
FIG. 2 is a schematic block diagram of an exemplary transmitting signal processing unit in a WLAN.

FIG. 2 is a schematic block diagram of an exemplary transmission signal processor in a WLAN.

Referring to FIG. 2, the transmitting signal processing unit 100 may include an encoder 110, an interleaver 120, a mapper 130, an Inverse Fourier Transformer (IFT) 140, and a Guard Interval (GI) inserter 150.

The encoder 110 encodes input data. For example, the encoder 110 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmitting signal processing unit 100 may further include a scrambler for scrambling the input data before encoding to reduce the probability of long sequences of 0 s or 1 s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits. Interleaving may be applied only when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, $N_{SS}$. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the $N_{SS}$ spatial streams into NsTS space-time streams and a spatial mapper for mapping the space-time streams to transmit chains. The spatial mapper may use direct mapping, spatial expansion, or beamforming.

The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MIMO is used, the transmitting signal processing unit 100 may insert Cyclic Shift Diversities (CSDs) to prevent unintentional beamforming. The CSD insertion may occur before or after IFT. The CSD may be specified per transmit chain or may be specified per space-time stream. Alternatively, the CSD may be applied as a part of the spatial mapper.

When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
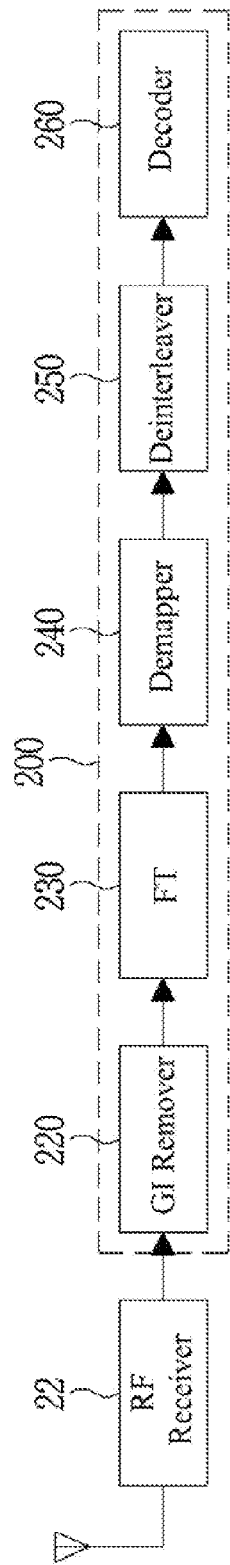
FIG. 3 is a schematic block diagram of an exemplary receiving signal processing unit in a WLAN.

FIG. 3 is a schematic block diagram of an exemplary a receiving signal processor in a WLAN.

Referring to FIG. 3, the receiving signal processing unit 200 includes a GI remover 220, a Fourier Transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied only when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, shortly as a 'listen before talk' access mechanism. According to the CSMA/CA mechanism, an AP and/or a STA may sense a medium or a channel for a predetermined time before starting transmission, that is, may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in minimizing collisions.

Figure 4:
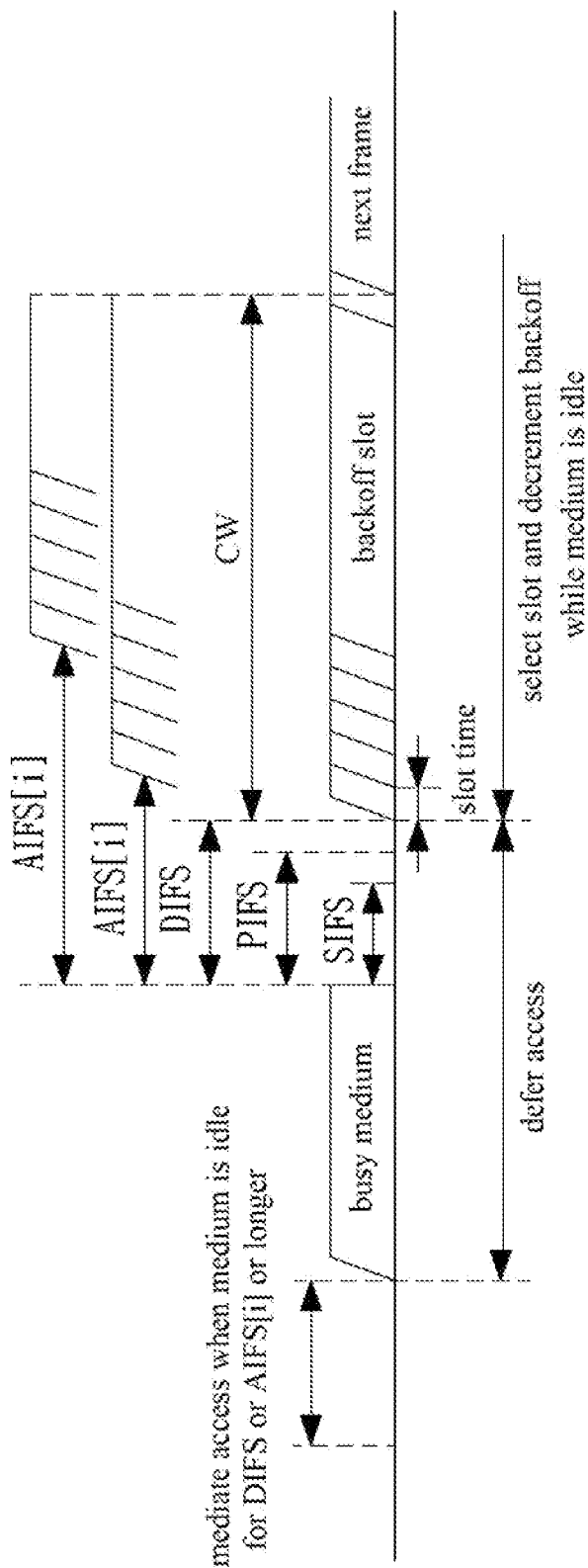
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data forwarded to a higher layer. The WLAN device transmits the data frame after performing backoff if a Distributed Coordination Function IFS (DIFS) has elapsed from a time when the medium has been idle. A management frame is used for exchanging management information which is not forwarded to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. In the case that the control frame is not a response frame to another frame, the WLAN device transmits the control frame after performing backoff if the DIFS has elapsed. In case that the control frame is a response frame to another frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated Access Category (AC), i.e., AIFS[i] (i is determined based on AC) has elapsed. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium gets idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempt transmission. The random backoff count is determined based on a Contention Window (CW) parameter and the medium is monitored continuously during count-down of backoff slots (i.e. decrement a backoff countdown) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
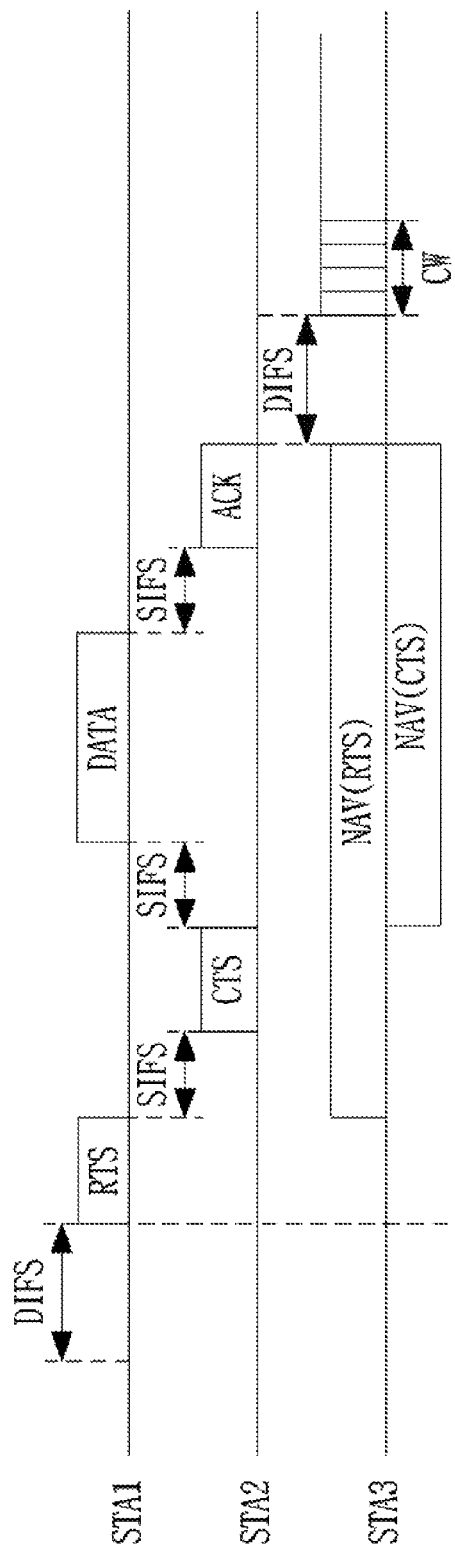
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a CSMA/CA-based frame transmission procedure for avoiding collisions between frames in a channel.

Referring FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA1 may determine the channel occupation based on an energy level on the channel or correlation of signals in the channel, or may determine the channel occupation by using a Network Allocation Vector (NAV) timer.

After determining that the channel is not being used by other devices during DIFS (that is, the channel is idle), STA1 may transmit an RTS frame to STA2 after performing backoff. Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIFS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed.

When the NAV timer expires, STA3 may determine whether the channel is busy through the use of carrier sensing. Upon determining that the channel is not in use by other devices during DIFS and after the NAV timer has expired, STA3 may attempt channel access after a contention window after a random backoff has elapsed.

Figure 6:
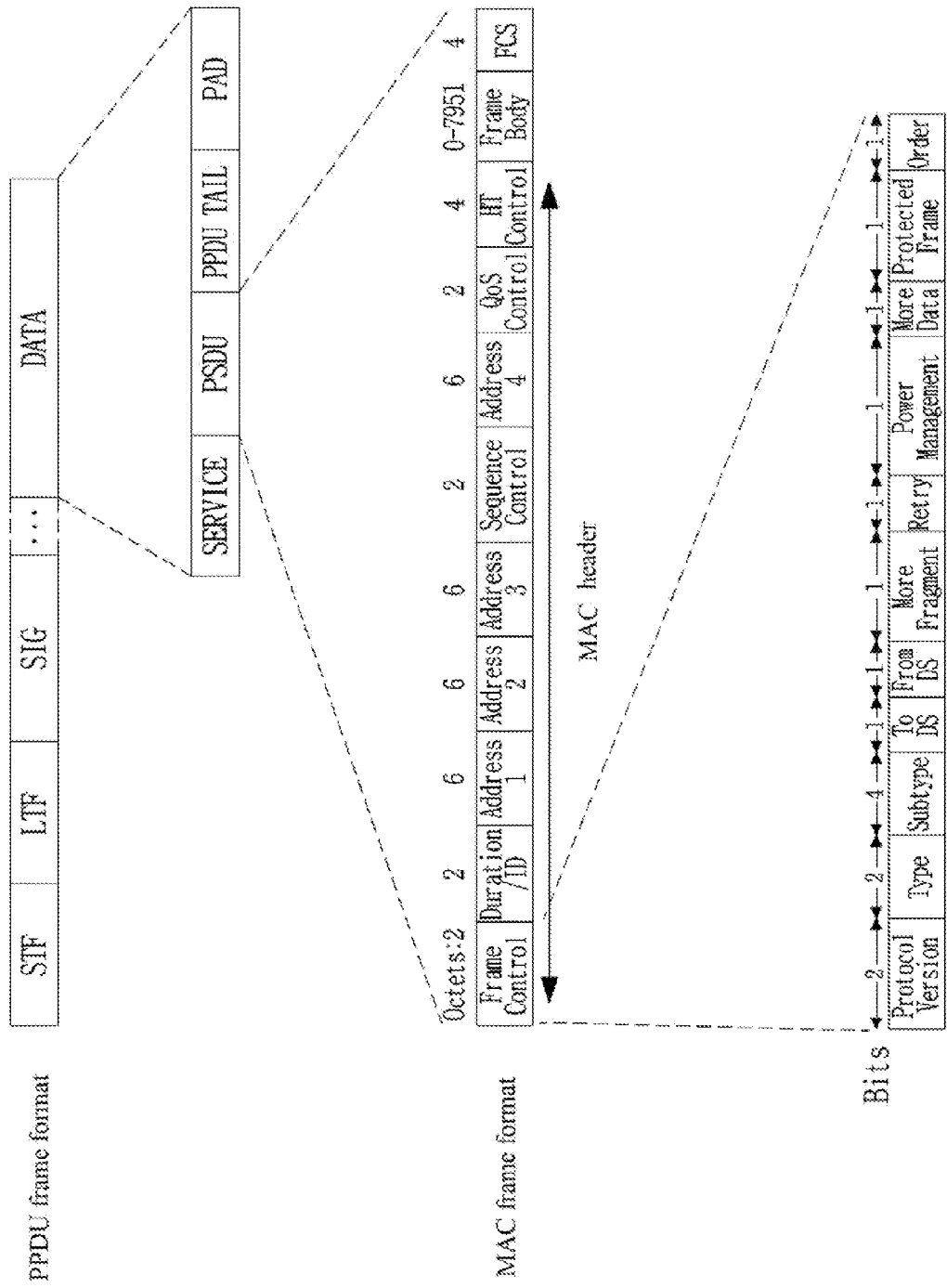
FIG. 6 depicts an exemplary frame structure in a WLAN system.

FIG. 6 depicts an exemplary frame structure in a WLAN system.

PHY layer may prepare a transmission MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11 ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present invention defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present specification, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
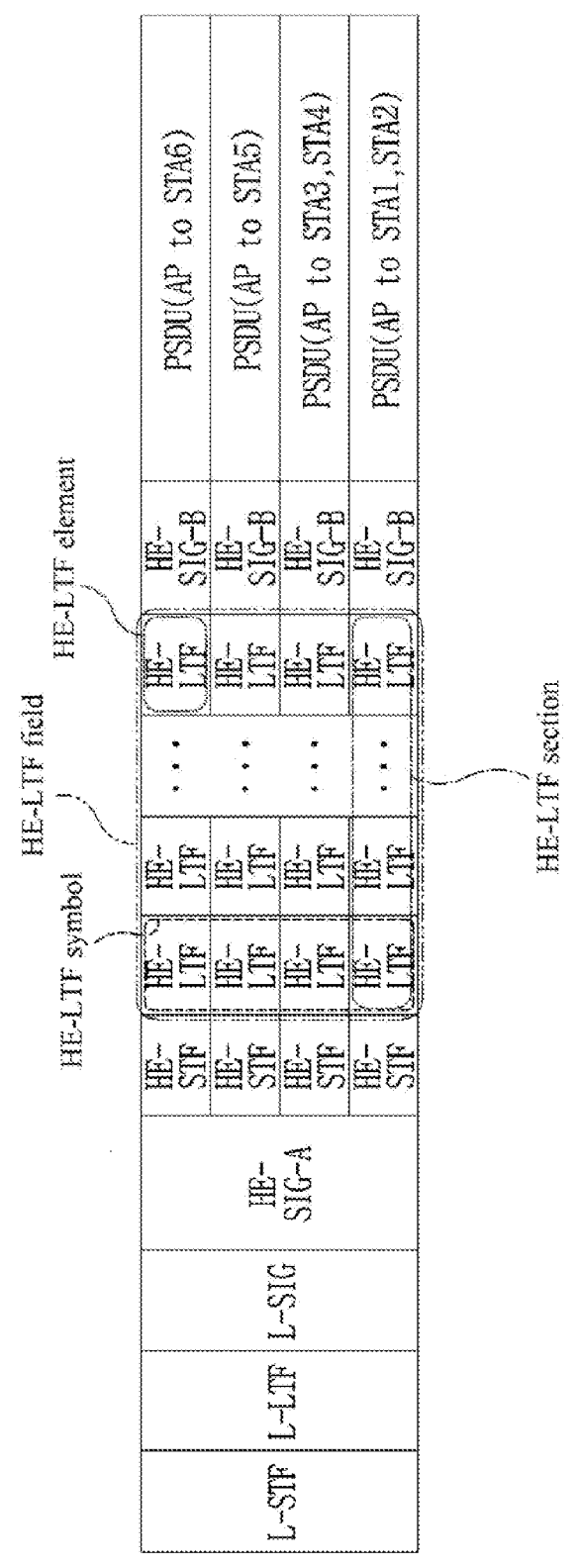

FIG. 7 depicts an exemplary HE PPDU frame format according to the present invention.

Referring to FIG. 7, the vertical axis represents frequency and the horizontal axis represents time. It is assumed that frequency and time increase in the upward direction and the right direction, respectively.

In the example of FIG. 7, one channel includes four subchannels. An L-STF, an L-LTF, an L-SIG, and an HE-SIG-A may be transmitted per channel (e.g., 20 MHz), a HE-STF and a HE-LTF may be transmitted on each subchannel being a basic subchannel unit (e.g., 5 MHz), and a HE-SIG-B and a PSDU may be transmitted on each of subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 7, the size of a subchannel allocated to each STA is equal to the size of the basic subchannel unit. For example, a first subchannel may be allocated for PSDU transmission from an AP to STAT and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may be referred to as Resource Unit (RU) or subband. In particular, the terms like OFDMA subchannel, OFDMA RU, OFDMA subband can be used in embodiments for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 7, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements are merely logical units and the PHY layer does not necessarily operate in units of an HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to a STA) in frequency domain.

A HE-LTF field may be a set of HE-LTF elements, HE-LTF symbols, or HE-LTF sections for a plurality of stations.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., setting a NAV based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The parameters set included in the HEW SIG-A field may include one or more of Very High Throughput (VHT) PPDU modulation parameters transmitted by IEEE 802.11ac stations, as listed in [Table 1] below, to ensure backward compatibility with legacy STAs (e.g., IEEE 802.11ac stations).

TABLE 1

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU:<br>Set to 1 if space time block coding is used and set to 0 otherwise.<br>For a VHT MU PPDU:<br>Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \leq p \leq 3$, uses bits B(10 + 3p) to B(12 + 3p). The number of space-time streams for user u are indicated at user position p = USER_POSITION[u] where u = 0, 1, ..., NUM_USERS − 1 and the notation A[b] denotes the value of array A at index b. Zero space-time streams are indicated at positions not listed in the USER_POSITION array. Each user position is set as follows:<br>Set to 0 for 0 space-time streams<br>Set to 1 for 1 space-time stream<br>Set to 2 for 2 space-time streams<br>Set to 3 for 3 space-time streams<br>Set to 4 for 4 space-time streams<br>Values 5-7 are reserved<br>For a VHT SU PPDU:<br>B10-B12<br>Set to 0 for 1 space-time stream<br>Set to 1 for 2 space-time streams<br>Set to 2 for 3 space-time streams<br>Set to 3 for 4 space-time streams<br>Set to 4 for 5 space-time streams<br>Set to 5 for 6 space-time streams<br>Set to 6 for 7 space-time streams<br>Set to 7 for 8 space-time streams<br>B13-B21<br>Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise.<br>The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC<br>For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU:<br>VHT-MCS index<br>For a VHT MU PPDU:<br>If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1.<br>If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1. |

TABLE 1-continued

| Two parts of VHT-SIG-A | Bit | Field | Number of bits | Description |
|---|---|---|---|---|
| | | | | If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1. B7 is reserved and set to 1 |
| | B8 | Beamformed | 1 | For a VHT SU PPDU: Set to 1 if a Beamforming steering matrix is applied to the waveform in an SU transmission as described in 20.3.11.11.2, set to 0 otherwise. For a VHT MU PPDU: Reserved and set to 1 NOTE-If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0-23 of VHT-SIG-A1 and bits 0-9 of VHT-SIG-A2, respectively. |
| | B18-B23 | Tail | 6 | Used to terminate the trellis of the convolutional decoder. Set to 0. |

[Table 1] illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11 ac-2013 technical specification. In the HE PPDU frame format of the present invention, the HE-SIG-A field may include one or more of the fields included in the VHT-SIG-A field, and it may provide backward compatibility with IEEE 802.11ac stations.

Figure 8:
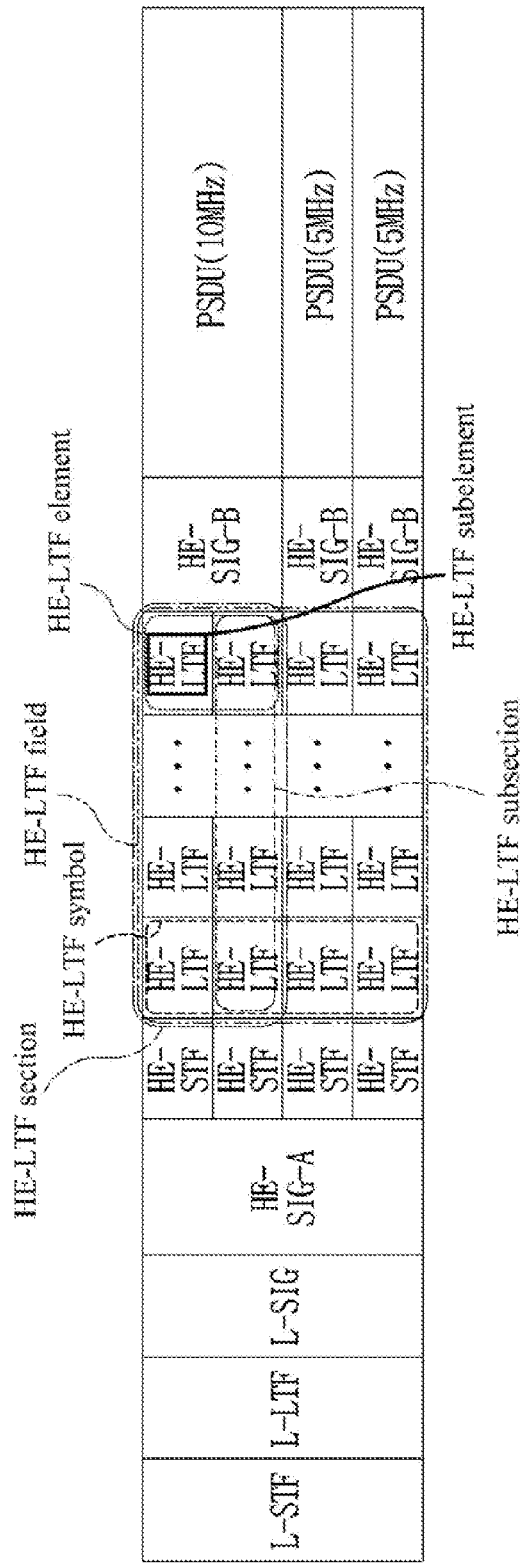
FIG. 8 depicts subchannel allocation in a HE PPDU frame format according to the present invention.

FIG. 8 depicts subchannel allocation in the HE PPDU frame format according to the present invention.

In the example of FIG. 8, it is assumed that information indicating subchannels to which STAs are allocated in HE PPDU indicates that a subchannel of 0 MHz is allocated to STAT (i.e., no subchannel is allocated), a subchannel of 5 MHz is allocated to each of STA2 and STA3, and a subchannel of 10 MHz is allocated to STA4.

In the example of FIG. 8, an L-STF, an L-LTF, an L-SIG, and a HE-SIG-A may be transmitted per channel (e.g., 20 MHz), a HE-STF and a HE-LTF may be transmitted on each of subchannels being basic subchannel units (e.g., 5 MHz), and a HE-SIG-B and a PSDU may be transmitted on each of subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 8, the size of a subchannel allocated to STA2 is equal to that of the basic subchannel unit, the size of a subchannel allocated to STA3 is equal to that of the basic subchannel unit, and the size of a subchannel allocated to STA4 is twice larger than that of the basic subchannel unit.

FIG. 8 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 8, one HE-LTF element includes one HE-LTF subelement in the 5-MHz subchannel allocated to STA2 or STA3. On the other hand, one HE-LTF element includes two HE-LTF subelements in the third subchannel, i.e., 10-MHz subchannel, allocated to STA4. A HE-LTF element and a HE-LTF subelement are merely logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to a STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 8, one HE-LTF section includes one HE-LTF subsection in the 5-MHz subchannel allocated to STA2 or STA3. On the other hand, one HE-LTF section includes two HE-LTF subsections in the third subchannel, i.e., 10-MHz subchannel, allocated to STA4.

A HE-LTF field may correspond to a set of HE-LTF elements (or subelements), HE-LTF symbols, or HE-LTF sections (or subsections) for a plurality of stations.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 7, if one channel includes four subchannels, it may not be allowed to keep the third subchannel unallocated and empty, while the first, second, and fourth subchannels are allocated to STAs. However, the present invention does not exclude non-allocation of an intermediate subchannel of one channel to a STA.

Figure 9:
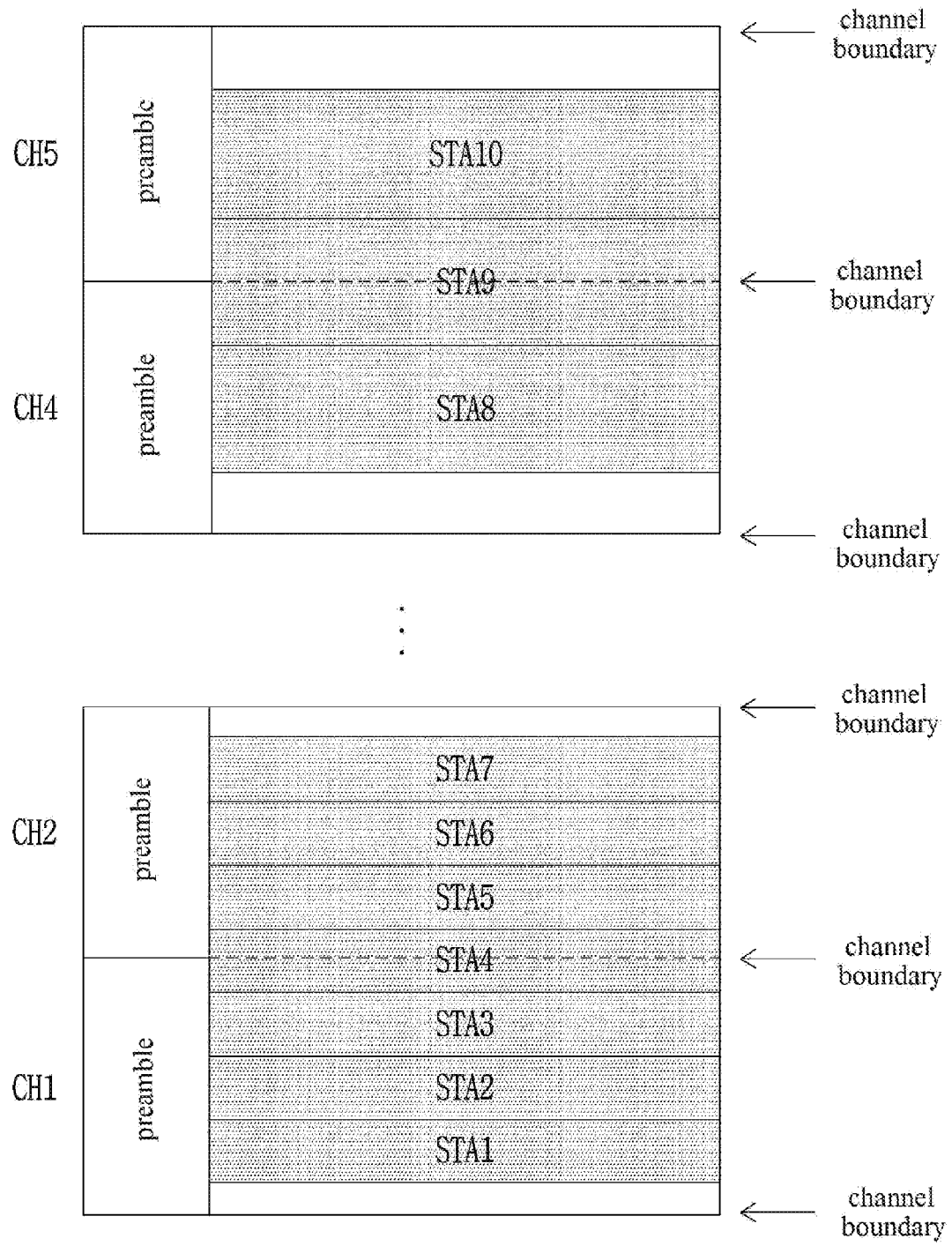
FIG. 9 depicts a subchannel allocation method according to the present invention.

FIG. 9 depicts a subchannel allocation method according to the present invention.

In the example of FIG. 9, a plurality of contiguous channels (e.g., 20-MHz-bandwidth channels) and boundaries of the plurality of contiguous channels are shown. In FIG. 9, a preamble may correspond to an L-STF, an L-LTF, an L-SIG, and a HE-SIG-A as illustrated in the examples of FIGS. 7 and 8.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 9 is based on the assumption that subchannels each having the size of a basic subchannel unit (e.g., 5 MHz) in CH1 and CH2 are allocated to STA1 to STA7, and subchannels each having double the size (e.g., 10 MHz) of the basic subchannel unit in CH4 and CH5 are allocated to STA8, STA9, and STA10.

As illustrated in the lower part of FIG. 9, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to the two channels). In the forgoing example of the present invention, the subchannel allocation to STA4 is not allowed.

As illustrated in the upper part of FIG. 9, although a subchannel allocated to STA8 or STA10 is fully overlapped only with one channel (i.e., crossing the channel boundary, or belonging only to one channel), a subchannel allocated to STA9 is partially overlapped with two channels (i.e., crossing the channel boundary, or belonging to the two channels). In the forgoing example of the present invention, the subchannel allocation to STA9 is not allowed.

On the other hand, it may be allowed to allocate a subchannel partially overlapped between a plurality of channels (i.e., crossing the channel boundary, or belonging to two channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present invention and thus should not be construed as limiting the present invention. For example, the bandwidths of a channel and a subchannel may be defined or allocated as values other than the above examples. In addition, a plurality of subchannels in one channel may have the same or different channel widths.

Figure 10:
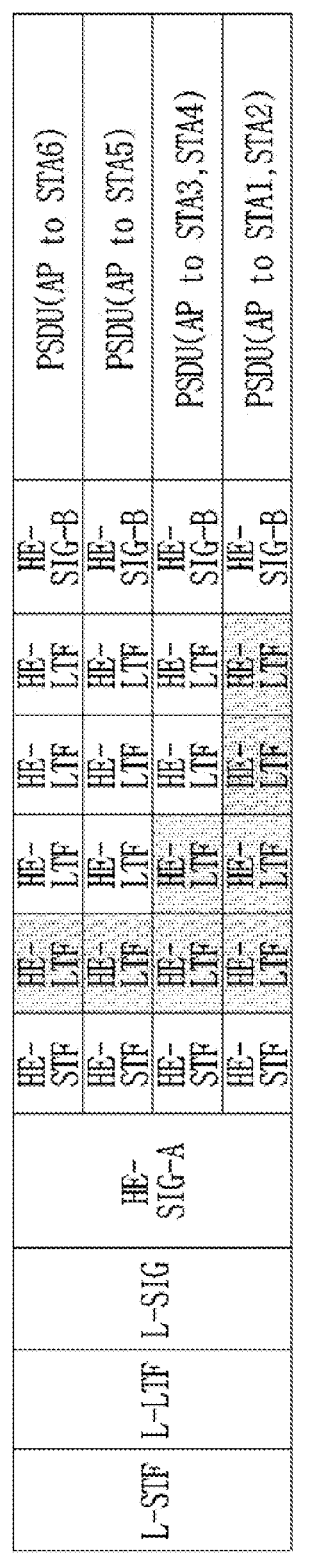

FIG. 10 depicts the starting and ending points of a HE-LTF field in the HE PPDU frame format according to the present invention.

To support the MU-MIMO mode and the OFDMA mode, the HE PPDU frame format according to the present invention may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in detail.

FIG. 10 is based on the assumption that a first 5-MHz subchannel is allocated to STAT and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are required to support MU-MIMO transmission.

According to an example of the present invention, a relationship between a number of total spatial streams transmitted in one subchannel and a number of HE-LTF are listed in [Table 2].

TABLE 2

| Total number of spatial streams transmitted on one subchannel | Number of HE-LTFs |
| --- | --- |
| 1 | 1 |
| 2 | 2 |
| 3 | 4 |
| 4 | 4 |
| 5 | 6 |
| 6 | 6 |
| 7 | 8 |
| 8 | 8 |

Referring to [Table 2], if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number of adding 1 to the number of the spatial streams need to be transmitted.

Referring to FIG. 10 again, it is assumed that the second 5-MHz subchannel is allocated to STA3 and STA4 and one spatial streams per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 10, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby no orthogonality is maintained. To overcome this problem, an additional constraint need to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the numbers of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the numbers of HE-LTFs (HE-LTF symbols or HE-LTF elements in a HE-LTF section) required according to the total numbers of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 7) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to [Table 2]). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (P is an integer equal to or larger than 1) HE-LTF symbols (refer to FIG. 7) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e. P) of another subchannel. Also, the number of HE-LTF elements (i.e., P) included in a HE-LTF section in one of the Q subchannels may be equal to the number of HE-LTF elements (i.e. P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or stations).

Referring to FIG. 10 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 10, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are actually not used for channel estimation at the STAs.

FIG. 11 depicts a HE-SIG-B field and a HE-SIG-C field in the HE PPDU frame format according to the present invention.

To effectively support MU-MIMO-mode or OFDMA-mode transmission in the HE PPDU frame format according to the present invention, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, a HE-SIG-A field. A HE-SIG-B field may include spatial stream allocation information about one subchannel. Also, a HE-SIG-C field may be transmitted after transmission of HE-LTFs, including MCS information about a PSDU and information about the length of the PSDU, etc.

With reference to the foregoing examples of the present invention, mainly the features of a HE PPDU frame structure applicable to a DL MU-MIMO-mode or OFDMA-mode transmission that an AP transmits simultaneously to a plurality of STAs have been described. Now, a description will be given of the features of a HE PPDU frame structure applicable to a UL MU-MIMO-mode or OFDMA-mode transmission that a plurality of STAs transmits simultaneously to an AP.

The above-described various examples of structures of the HE PPDU frame format supporting MU-MIMO-mode or OFDMA-mode transmission are not applicable only to DL but also applicable UL. For example, the above-described exemplary HE PPDU frame formats may also be used for a UL HE PPDU transmission that a plurality of STAs simultaneously transmits to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to a HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmits to an AP, each STA being a transmission entity may be aware only of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without a modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTE section) on each subchannel according to the maximum number of spatial streams, and including information about the number of spatial streams for the individual STA in a HE-SIG-B field.

Alternatively, if the STAs operate always according to the common/individual parameters received in the trigger frame from the AP, each STA does not need to indicate the common/individual parameters to the AP during a HE PPDU transmission. Therefore, this information may not be included in a HE PPDU. For example, each STA may have only to determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel BandWidth (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 12 may be used for a UL HE PPDU transmission.

Figure 12:
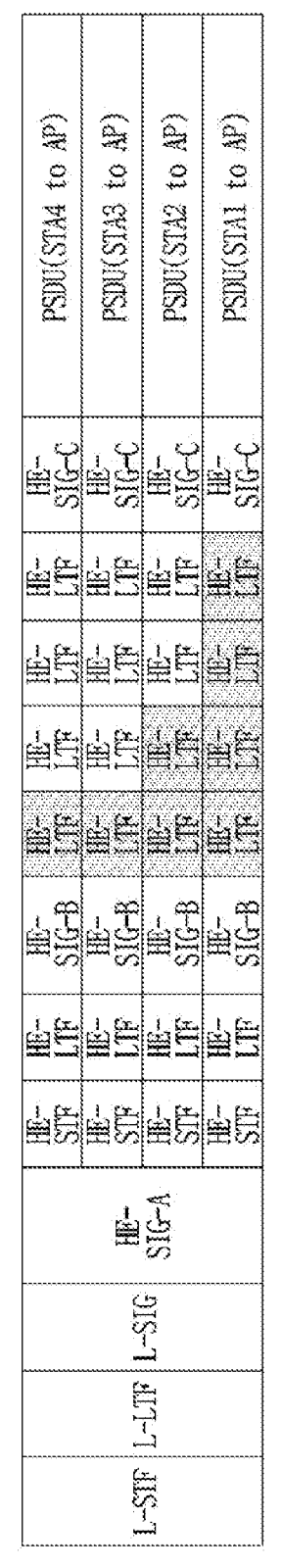

FIG. 12 depicts another exemplary HE PPDU frame format according to the present invention. The HE PPDU frame format illustrated in FIG. 12 is characterized in that a structure of HE-SIG-A, HE-SIG-B, and HE-SIG-C fields similar to in FIG. 10 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE-SIG-B field) illustrated in FIG. 12 may not exist. In this case, a description of each field given below may be understood that it is applied only in the presence of the field.

In the example of FIG. 12, a HE-SIG-A field is transmitted per channel (i.e., per 20-MHz channel) and may include transmission parameters common to simultaneously transmitted HE PSDUs. Since the same information is transmitted in up to HE-SIG-A fields in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similarly to DL MU-MIMO-mode or OFDMA-mode HE PPDU transmission, transmissions of PSDUs may start at different time points on subchannels in UL MU-MIMO-mode or OFDMA-mode HE PPDU transmission, and if OFDM symbols are not aligned accordingly, then the implementation complexity of an AP that receives a plurality of PSDUs increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 10.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

As described before, a plurality of STAs may simultaneously transmit PSDUs in a HE PPDU frame format to an AP on subchannels allocated to the STAs (i.e., referred to as UL MU-MIMO or OFDMA transmission or "UL MU transmission"), and a plurality of STAs may simultaneously receive a PSDU in a HE PPDU frame format from an AP on subchannels allocated to the STAs (i.e., referred to as DL MU-MIMO or OFDMA transmission or "DL MU transmission").

Now, a description will be given of an exemplary ACK procedure of a receiver (i.e., an AP) in response to a UL MU-MIMO or OFDMA transmission and an exemplary ACK procedure of a receiver (i.e., each of a plurality of STAs) in response to a DL MU-MIMO or OFDMA transmission according to the present invention.

According to the present invention, ACK frames transmitted in response to an MU transmission for a plurality of STAs may have the same property for each of the STAs. Specifically, ACK frames transmitted in response to an MU transmission for a plurality of STAs may have the same length, transmission time, or type for each of the STAs. An AP may transmit DL ACK frames to a plurality of STAs in response to a UL MU transmission and the DL ACK frames for the STAs may have the same property. The plurality of STAs may transmit UL ACK frames to the AP in response to a DL MU transmission and the UL ACK frames from the STAs may have the same property.

Such an MU transmission for a plurality of STAs may be elicited by a trigger frame transmitted from an MU transmission-receiver. For example, the trigger frame may be a CTS frame, a PS-Poll frame, or an ACK frame.

FIG. 13 depicts an exemplary block ACK procedure performed in response to a UL MU transmission according to the present invention.

FIG. 13 illustrates an example in which ACK frames for a UL MU transmission elicited by a trigger frame (i.e., a CTS frame) transmitted from an AP have the same property for each of a plurality of STAs. In FIG. 13, a plurality of STAs respectively transmit data frames (e.g., PPDU frames each including a PSDU, on a plurality of subchannels) on subchannels allocated to the STAs and receive ACKs in block ACK frames from an AP in response to the transmitted data frames.

In the example of FIG. 13, upon expiration of a backoff timer, an STA (e.g., STA1) may transmit an RTS PPDU to the AP according to an Enhanced Distributed Channel Access (EDCA) protocol.

Upon receipt of the RTS PPDU, the AP may determine STAs (e.g., STA2, STA3, and STA4) to perform a UL MU-MIMO or OFDMA transmission simultaneously with STA1 and transmit a CTS PPDU to the plurality of STAs. The CTS PPDU may include a list of STAs (e.g., STA1, STA2, STA3, and STA4) allowed to be allocated to subchannels and perform simultaneous PSDU transmissions on the subchannels. That is, the CTS PPDU may correspond to the afore-described trigger frame (or polling frame) for a UL MU-MIMO or OFDMA transmission.

Upon receipt of an indication allowing a UL MU-MIMO or OFDMA transmission in the CTS PPDU, the STAs transmit PSDUs on their allocated subchannels. In the example of FIG. 13, STA1, STA2, STA3, and STA4 transmit DATA PPDUs respectively on four subchannels. While not shown for clarity of description, the plurality of DATA PPDUs may be transmitted in a HE PPDU frame format in FIG. 13 (e.g., one or more of a L-STF, a L-LTF, a L-SIG, and a HE-SIG-A are transmitted on one channel, one or more of a HE-STF, a HE-LTF, a HE-SIG-B, and a HE-SIG-C are transmitted respectively on each subchannel, and a PSDU is transmitted on each subchannel). That is, a DATA PPDU for an STA allocated to one subchannel is a data frame including one or more of an L-STF, an L-LTF, an L-SIG, and a HE-SIG-A on one channel, one or more of a HE-STF, a HE-LTF, a HE-SIG-B, and a HE-SIG-C on one subchannel, and a PSDU on one subchannel. This may be referred to as a data frame on a subchannel from the perspective of a PSDU (i.e., an MPDU or A-MPDU). Further, a set of the plurality of DATA PSDUs illustrated in FIG. 13 corresponds to a HE PPDU frame including a legacy preamble, a HE preamble, and PSDUs (i.e., MPDUs or A-MPDUs) on a plurality of subchannels and this may be referred to as a data frame on one channel including a plurality of subchannels, from the perspective of PSDUs (i.e., MPDUs or an Aggregate MPDU (A-MPDU)).

Upon receipt of PSDUs on the respective subchannels from the plurality of STAs, the AP may transmit ACKs in response to the received PSDUs, in the form of blocks ACKs on the subchannels in which the PSDUs haven been received. A block ACK procedure is a scheme in which one block ACK frame is used for a plurality of MPDUs instead of individual ACKs for all MPDUs. An MPDU transmitted from the MAC layer to the PHY layer may correspond to a PSDU at the PHY layer (although an MPDU is similar to a PSDU, a plurality of individual MPDUs aggregated into an A-MPDU may be different from the PSDU). The block ACK frame includes a block ACK bitmap and each bit of the block ACK bitmap may indicate reception success/failure (or decoding success/failure) of an individual MPDU. For details of a legacy block ACK procedure, the IEEE 802.11c technical specifications may be referred to.

A detailed configuration of ACK PPDUs on a plurality of subchannels in the example of FIG. 13, may be described in a similar manner to the afore-described detailed configuration of DATA PPDUs on a plurality of subchannels. That is, ACK PPDUs on a plurality of subchannels may collectively correspond to ACK frames constructed in a HE PPDU frame format and may be referred to as an ACK frame on one channel including a plurality of subchannels from the perspective of PSDUs (i.e., MPDUs or an A-MPDU). From the viewpoint of individual ACK PPDUs, each ACK PPDU may be an ACK frame including a legacy preamble transmitted on one channel, and a HE preamble and a PSDU transmitted on one subchannel and may be referred to as an ACK frame on a subchannel from the perspective of a PSDU (i.e., an MPDU or A-MPDU).

As described above, a plurality of block ACK frames that an AP transmits to a plurality of STAs on a plurality of subchannels at the same time may have the same property (e.g., the same length, transmission time, or type).

Figure 14:
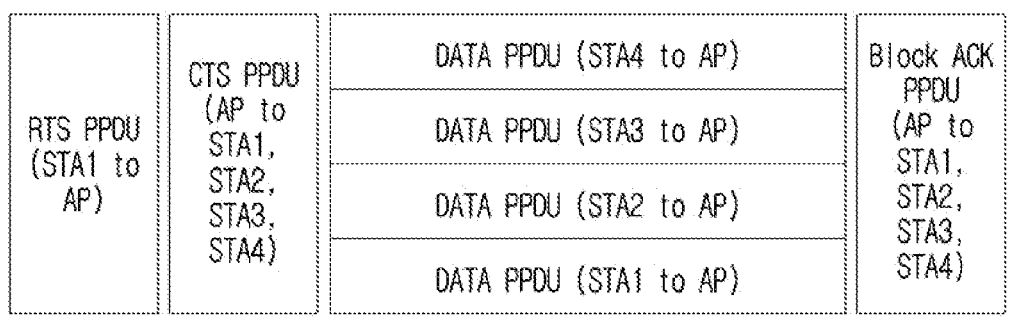
FIG. 14 depicts another exemplary block ACK procedure in response to a UL MU transmission according to the present invention.

FIG. 14 depicts another exemplary block ACK procedure performed in response to a UL MU transmission according to the present invention.

FIG. 14 illustrates an example in which ACK frames for a UL MU transmission elicited by a trigger frame (i.e. a CTS frame) from an AP have the same property for the plurality of STAs. In the example of FIG. 14, transmission of an RTS PPDU, transmission of a CTS PPDU, and MU-MIMO or OFDMA transmission of a DATA PPDU on an allocated subchannel by each STA are performed in the same manner as in FIG. 13 and thus will not be described to avoid redundancy.

As in the afore-described example of FIG. 13, a procedure for transmitting block ACK PPDUs to a plurality of STAs on a plurality of subchannels in response to a received UL MU-MIMO or OFDMA transmission increases overhead in view of configuration of a different DATA PPDU for each subchannel by the AP. Accordingly, a block ACK for a UL MU-MIMO or OFDMA transmission may be transmitted on total subchannels in the example of FIG. 14.

That is, it may be said that the AP transmits block ACK PPDUs in OFDMA to the individual STAs at the same time in FIG. 13, while the AP multicasts/broadcasts a block ACK PPDU having an aggregate of block ACK bitmaps for the respective STAs on the total subchannels (e.g., on one channel without distinction made between the subchannels, that is, in non-OFDMA). Accordingly, the overhead of the AP may be reduced, compared to generation and transmission of PPDUs on individual subchannels.

In this manner, one block ACK frame that the AP transmits on one channel to the plurality of STAs may have the same property (e.g., the same length, transmission time, or type).

In the foregoing examples of the present invention, if an AP transmits a trigger frame to a plurality of STAs and receives a UL MU frame from the plurality of STAs in response to the trigger frame, the AP may determine a transmission mode for an ACK frame to be transmitted in response to the UL MU frame, based on the UL MU frame. That is, upon receipt of a UL MU frame, the AP may select one of OFDMA (e.g., the example of FIG. 13) and non-OFDMA (e.g., the example of FIG. 14) as the transmission mode of the ACK frame based on information about the UL MU frame (e.g., control information included in the UL MU frame, the transmission mode or type of the UL MU frame, etc.), and generate and transmit an ACK frame according to the determined transmission mode on DL.

An STA may transmit the UL MU frame in response to the trigger frame received from the AP and receive the ACK frame from the AP in response to the UL MU frame. The STA may process the ACK frame according to the transmission mode of the received ACK frame. The transmission mode of the ACK frame may be determined based on the UL MU frame that the STA has transmitted to the AP. For example, if the transmission mode of the ACK frame is OFDMA, the STA may acquire ACK information for the STA by decoding a signal received on a subchannel allocated to the STA. If the transmission mode of the ACK frame is non-OFDMA, the STA may acquire ACK information for the STA by decoding a signal received on an entire channel.

FIG. 15 depicts an exemplary ACK procedure performed in response to a DL MU transmission according to the present invention.

FIG. 15 illustrates an example in which ACK frames transmitted in response to a DL MU transmission triggered by a trigger frame (i.e., a CTS frame) transmitted by an STA have the same property for a plurality of STAs. In FIG. 15, the AP allocates subchannels to the respective STAs, transmits PSDUs simultaneously to the STAs on the subchannels, and receives ACKs in response to the PSDUs, in the form of block ACKs from the plurality of STAs.

In the example of FIG. 15, upon expiration of a backoff timer, the AP may transmit an RTS PPDU to a destination STA (e.g., STA1) according to the EDCA protocol.

Upon receipt of the RTS PPDU, the destination STA (e.g., STA1) may transmit a CTS PPDU to the AP. Upon receipt of the CTS PPDU, the AP may transmit PSDUs simultaneously to a plurality of STAs by allocating subchannels to the respective STAs. The plurality of STAs may include other STAs (e.g., STA2, STA3, and STA4) as well as the destination STA (e.g., STA1) that has exchanged RTS/CTS with the AP. In the example of FIG. 15, the AP transmits DATA PPDUs to STA1, STA2, STA3, and STA4 on four subchannels, respectively. While not shown for clarity of description, the plurality of DATA PPDUs may be transmitted in a HE PPDU frame format (e.g., one or more of a L-STF, a L-LTF, a L-SIG, and a HE-SIG-A are transmitted on one channel, one or more of a HE-STF, a HE-LTF, a HE-SIG-B, and a HE-SIG-C are transmitted respectively on each subchannel, and a PSDU is transmitted on each subchannel) in FIG. 15. That is, a DL DATA PPDU of FIG. 15 may be configured similarly to a UL DATA PPDU of FIG. 13 and a UL ACK PPDU of FIG. 15 may be configured similarly to a DL ACK PPDU of FIG. 13.

Upon receipt of a PSDU on a subchannel from the AP, each STA may transmit an ACK in response to the received PSDU, in the form of a block ACK on the subchannel in which the PSDU has been received.

Meanwhile, if the ACK policy of a DATA PPDU transmitted on a subchannel is normal ACK, an STA that has received the DATA PPDU responds to the DATA PPDU with a normal ACK PPDU, instead of a block ACK PPDU. For example, in the case where a DATA PPDU is transmitted in the form of an A-MPDU, like a VHT single PPDU or an HE single PPDU but includes only one MPDU, it may be regulated that an STA receiving the DATA PPDU responds to the DATA PPDU with a normal ACK PPDU, instead of a block ACK PPDU.

Considering the above, it may occur that DATA PPDUs transmitted on different subchannels have different ACK policies. In this case, each STA receiving a DATA PPDU transmits a different type of ACK PPDU. For example, STA1 may transmit a block ACK PPDU to the AP, as an ACK in response to a PSDU received on a first subchannel, and STA2 may transmit a normal ACK PPDU to the AP, as an ACK in response to a PSDU received on a second subchannel. Since a normal ACK PPDU and a block ACK PPDU typically have different lengths, the length of the response frame transmitted on the first subchannel by STA1 may be different from the length of the response frame transmitted on the second subchannel by STA2. However, to enable a receiver (e.g., the AP) to receive response frames successfully in MU-MIMO or OFDMA in which a plurality of STAs perform simultaneous transmissions, the STAs need to be identical in terms of the length, transmission time, or type of response frames that the STAs transmit. Therefore, for the plurality of STAs, the same ACK policy should be configured for DATA PPDUs transmitted on the plurality of subchannels.

In the example of FIG. 15, data frames that the AP transmits to the plurality of STAs in a DL MU transmission may be regarded as trigger frames for ACK frames that the plurality of STAs transmit to the AP in a UL MU transmission. That is, the UL MU ACK frames may be transmitted based on information of the trigger frames for them (e.g., the ACK policies of the DL MU data frames).

As described above, a plurality of block ACK frames transmitted simultaneously on a plurality of subchannels by a plurality of STAs may have the same property (e.g., the same length, transmission time, or type).

FIG. 16 depicts another exemplary ACK procedure performed in response to a DL MU transmission according to the present invention.

FIG. 16 illustrates an example in which ACK frames transmitted in response to a DL MU transmission triggered by a trigger frame (i.e., a CTS frame) transmitted by an STA have the same property for a plurality of STAs. In FIG. 16, if the ACK policy of a DATA PPDU is normal ACK, like a VHT single PPDU or a HE single PPDU, the ACK policy of a DATA PPDU transmitted on each subchannel is set uniformly to normal ACK and response frames for the DATA PPDUs are received as normal ACK PPDUs.

In the example of FIG. 16, data frames that the AP transmits to the plurality of STAs in a DL MU transmission may be regarded as trigger frames for ACK frames that the plurality of STAs transmit to the AP in a UL MU transmission. That is, the UL MU ACK frames may be transmitted based on information of the trigger frames for them (e.g., the ACK policies of the DL MU data frames).

As described above, a plurality of normal ACK frames transmitted simultaneously on a plurality of subchannels by a plurality of STAs may have the same property (e.g., the same length, transmission time, or type).

As in the example of FIG. 15 or FIG. 16, the same ACK policy should be set for ACKs transmitted by all STAs paired for MU-MIMO or OFDMA. For example, the ACK policy should be set so as to avoid the case where the ACK policy of a DATA PPDU transmitted on a subchannel is block ACK and the ACK policy of a DATA PPDU transmitted on another subchannel is normal ACK, and DATA PPDUs should be transmitted, which enable the same type of ACK policy across all subchannels (or for all STAs).

Figure 17:
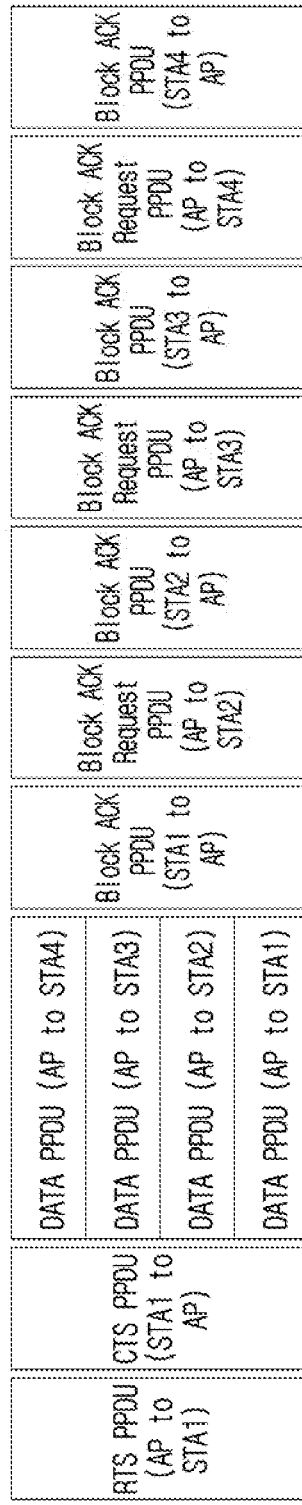
FIG. 17 depicts another exemplary ACK procedure performed in response to a DL MU transmission according to the present invention.

FIG. 17 depicts another exemplary ACK procedure performed in response to a DL MU transmission according to the present invention.

In FIG. 17, ACK frames transmitted in response to a DL MU transmission triggered by a trigger frame (i.e., a CTS frame) transmitted by an STA have the same property for a plurality of STAs.

FIG. 17 illustrates an exemplary ACK procedure in the case where DATA PPDUs having different ACK policies are transmitted in DL MU-MIMO or OFDMA. In the example of FIG. 17, the AP and STA1 exchange an RTS PPDU and a CTS PPDU with each other and the AP transmits DATA PPDUs in MU-MIMO or OFDMA to a plurality of STAs, as in the example of FIG. 15. Thus, a redundant description is avoided herein.

Among DATA PPDUs transmitted on a plurality of subchannels, the ACK policy of a DATA PPDU transmitted on a subchannel may be set to Implicit Block Ack Request, while the ACK policies of DATA PPDUs transmitted on the remaining subchannels may be set to block ACK. Therefore, the plurality of STAs, which have received data in DL MU-MIMO or OFDMA mode, may transmit ACKs to the AP sequentially in time.

For example, if the ACK policy of a DATA PPDU transmitted to STA1 on the first subchannel is Implicit Block Ack Request, STA1 may transmit a block ACK PPDU to the AP even though STA1 does not receive a block ACK request from the AP after receiving the DATA PPDU. Herein, STA1 may transmit the block ACK PPDU not on a subchannel but all subchannels including the subchannel (e.g., on one channel).

After receiving a block ACK request PPDU from the AP, the remaining STAs (i.e., STA2, STA3, and STA4) may transmit block ACK PPDUs to the AP accordingly. The block ACK request PPDU and the block ACK PPDUs may be transmitted not on subchannels in which related DATA PPDUs have been received but on all the subchannels including the subchannels (e.g., on the one channel).

The plurality of block ACK frames that the plurality of STAs transmit sequentially in time on one channel as described above may have the same property (e.g., the same length, transmission time, or type).

In the foregoing example of the present invention, an AP may transmit a DL MU frame to a plurality of STAs and receive UL ACK frames from the plurality of STAs in response to the DL MU frame. Since the transmission mode of the UL ACK frames is determined based on information provided by the DL MU frame, the AP may receive the UL ACK frames according to the transmission mode. In other words, if the AP transmits a DL MU data frame having the same ACK policy for all of the STAs, the AP may receive a UL MU ACK frame (e.g., the example of FIG. 15 or FIG. 16). If the AP transmits a DL MU data frame having different ACK policies for the plurality of STAs, the AP may receive UL SU ACK frames sequentially (e.g., the example of FIG. 17).

If an STA receives a DL MU data frame having DL data for the STA and DL data for one or more other STAs from the AP, the STA may determine the transmission mode of a UL ACK frame based on the DL MU data frame. That is, upon receipt of a DL MU data frame having the same ACK policy for all STAs, the STA may transmit its individual ACK frame simultaneously with individual ACK frames of one or more other STAs (e.g., the example of FIG. 15 or FIG. 16). On the other hand, upon receipt of a DL MU data frame having different ACK policies for the plurality of STAs, the STA may transmit a UL SU ACK frame at a transmission timing indicated by the AP (e.g., the example of FIG. 17).

According to the present invention, an MU-transmission receiver may determine a channel access operation depending on whether a reception error has occurred during an MU transmission. It may be determined based on a minimum MU transmission unit whether a reception error has occurred to an MU transmission related to a plurality of users. Specifically, if there is no reception error for at least one user of an MU transmission, it may be determined that the MU transmission is error-free. Or if there is no reception error for at least one subchannel of the MU transmission, it may be determined that the MU transmission is error-free. Inter-Frame Space (IFS) processing of channel access may be different depending on whether a reception error has occurred. The MU-transmission receiver may be an intended destination or a third-party STA. For example, in the case of a UL MU transmission, the same channel access operation may be performed according to generation or non-generation of a reception error irrespective of whether the MU transmission receiver is an AP or a third-party STA.

Further, an MU transmission may be transmitted as a frame responding to a trigger frame. For example, a plurality of users may transmit UL OFDMA MPDUs or A-MPDUs in response to a trigger frame received from an AP. Upon successful receipt of an MU transmission from at least one user (i.e., without a reception error), the MU-transmission receiver (e.g., the AP) may determine that a frame exchange procedure initiated by the trigger frame is successful and the MU transmission is free of an error.

In the case where the AP multicasts/broadcasts a block ACK PPDU across total subchannels to a plurality of transmitting STAs as in the example of FIG. 14, block bitmaps for the respective transmitting STAs (e.g., STA1, STA2, STA3, and STA4) should be included in the block ACK PPDU. In addition, control information about each of the transmitting STAs (e.g., a Frame Control field, a QoS control field, a (HE variant) HT control field) may be included in the block ACK PPDU. The (HE variant) HT control field may be used for a data receiver to indicate most optimum transmission parameters (e.g., an MCS, the number of spatial streams, etc.) for the data receiver to a data transmitter (e.g., a source).

For example, if an STA operates in Power Save Mode (PSM) and then starts a Service Period (SP) by transmitting a trigger frame to the AP, an End Of Service Period (EOSP) subfield may be set to 1 in a QoS control field of the last frame transmitted by the AP in order to indicate the ending point of one or more frames transmitted to the STA by the AP. Upon receipt of the EOSP subfield, the STA may terminate the SP. If a plurality of transmitting STAs operate in the PSM and then start an SP by transmitting trigger frames in the example of FIG. 14, an EOSP subfield of a QoS control field of a frame transmitted by the AP may be signaled separately to each transmitting STA because the SP may end at different time points for the transmitting STAs. Further, one or more of a QoS control field, a Frame Control field, and an (HE variant) HT control field may be separately signaled to each data transmitting STA.

Meanwhile, if only one piece of control information (e.g., only one of a Frame Control field, a QoS control field, and a (HE variant) HT control field) is included in a block ACK PPDU, the control information may be applied commonly to the plurality of data transmitting STAs.

Figure 18:
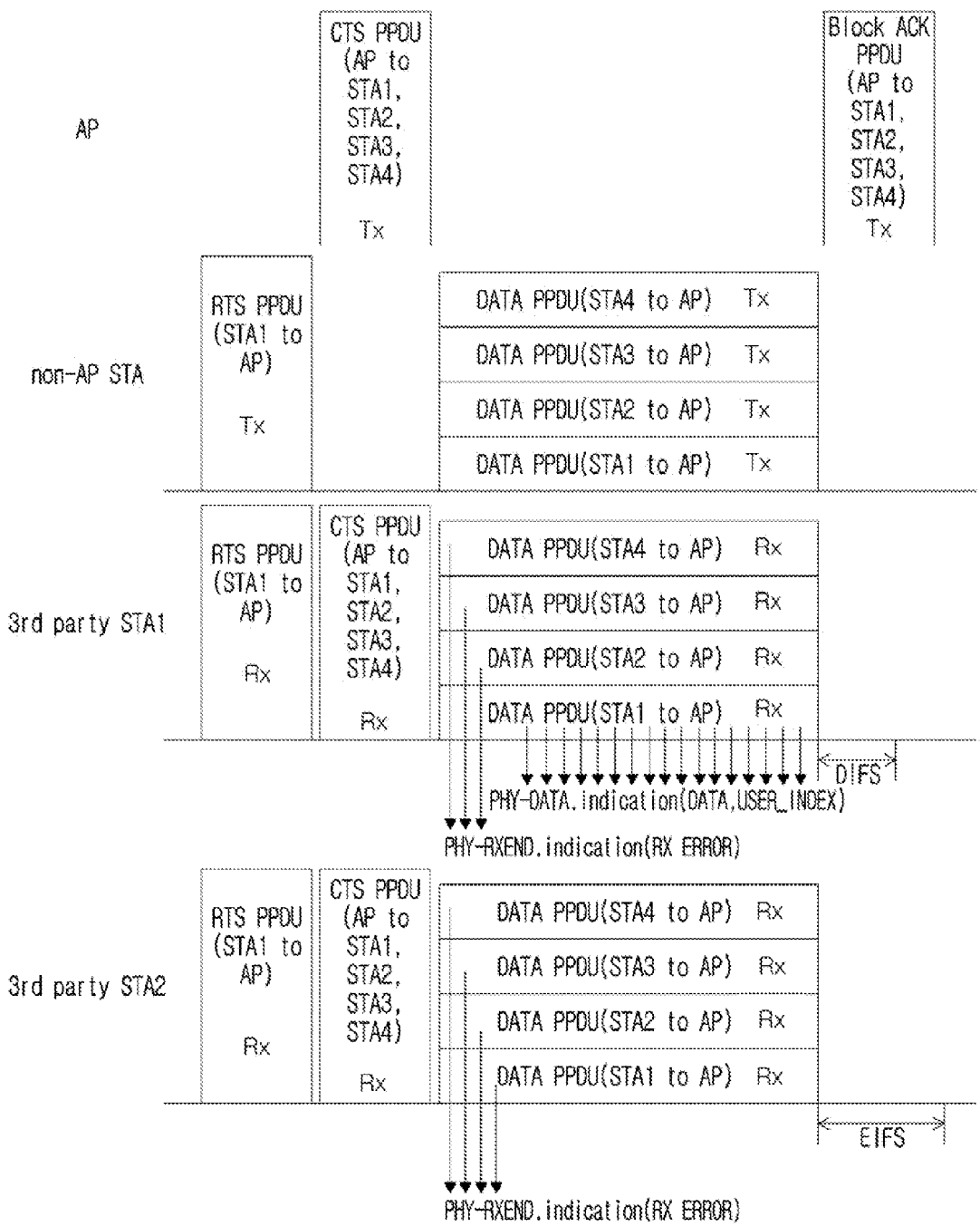
FIG. 18 depicts an operation for receiving an MU PPDU according to the present invention.

FIG. 18 depicts an operation for receiving an MU PPDU according to the present invention.

In the example of FIG. 18, a procedure in which an AP allocates subchannels to a plurality of STAs (e.g., STA1, STA2, STA3, and STA4) and the STAs simultaneously transmit PSDUs on the subchannels to the AP, and an operation of a third-party STA (i.e., an STA other than the STAs and the AP that exchange frames during a predetermined time period) are illustrated. In FIG. 18, non-AP STAs, STA1, STA2, STA3, and STA4 exchange frames with the AP, and third-party STA5 and third-party STA6 (i.e., STAs other than STA1 and STA2 that exchange frames with the AP) receive (i.e., overhear) the frames that the AP transmits or STA1, STA2, STA3, and STA4 transmit.

The third-party STAs may overhear all frames transmitted on a radio medium and perform virtual carrier sensing or physical carrier sensing. The virtual carrier sensing may include, for example, configuration of a Network Allocation Vector (NAC) based on a Duration field included in an overheard frame. The physical carrier sensing may include, for example, energy detection, preamble detection, and GI detection. These carrier sensing operations may be performed basically through primitives transmitted to the MAC layer by the PHY layer. For example, a timing at the MAC layer may be determined using primitives called PHY-TXEND.confirm, PHYTXSTART.confirm, PHY-RXSTART.indication, and PHY-RXEND.indication as references.

Among them, an example of the present invention regarding the PHY-RXEND.indication primitive and the PHY-DATA.indication primitive which are related to channel access of third-party STAs will be described in detail.

The PHY-RXEND.indication primitive is indication information indicating completion of on-going PSDU reception to a local MAC entity by the PHY layer. This primitive provides the parameters illustrated in [Table 3] below.

TABLE 3

PHY-RXEND.indication(
RXERROR,
RXVECTOR
)

In [Table 3], the RXERROR parameter may provide one or more of values indicating NoError, FormatVioloation, CarrierLost, or UnsupportedRate. After a receive state machine at the PHY layer detects what seems to be a valid preamble and a Start Frame Delimiter (SFD), many error conditions may take place. Parameters returned for each of the error conditions are given as follows.

NoError. This value is used to indicate that no error has been generated in a PHY reception process.

FormatViolation. This value is used to indicate the presence of an error in the format of a received PPDU.

CarrierLost. This value is used to indicate that PSDU processing may not be performed any longer because a carrier cannot be found during reception of an incoming PSDU.

UnsupportedRate. This value is used to indicate that an unsupported data rate has been detected during reception of an incoming PSDU.

Filtered. This value is used to indicate that a corresponding PPDU has been filtered out due to a condition set by PHYCONFIG VECTOR during reception of an incoming PSDU In [Table 3], RXVECTOR indicates a list of parameters provided to the local MAC entity, when the PHY layer receives a valid PHY header or the last PSDU data bit of a received frame. RXVECTOR is a parameter included only when a dot11RadioMeasurementActivated parameter is set to true. RXVECTOR may include all of MAC parameters and MAC management parameters.

The PHY-RXEND.indication primitive may be generated to indicate to the local MAC entity that the PHY receive state machine has completed reception with or without an error. In the presence of Signal Extension, the PHY-RXEND.indication primitive may be generated at the termination point of a signal extension.

If the value of RXERROR is NoERROR, the MAC layer may use the PHY-RXEND.indication primitive as a reference for a channel access timing.

Upon receipt of the PHY-RXEND.indication primitive, the MAC layer may start IFS processing.

The IFS processing will be described. After receiving a frame for which a PHY-RXEND.indication primitive indicating an error is reported or a frame having a wrong MAC FCS value, a DCF uses an Extended IFS (EIFS) to determine whether a medium is idle before transmission. Likewise, an EDCA mechanism based on a Hybrid Coordination Function (HCF) of an STA may use an interval of EIFS-DIFS+AIFS[AC]. The EIFS or the EIFS-DIFS+AIFS [AC] interval starts after there is an indication indicating that the medium is idle irrespective of a virtual carrier sensing mechanism, after the PHY layer detects an erroneous frame. An STA does not start transmission before expiration of the later between a NAV and the EIFS or EIFS-DIFS+AIFS[AC]. The EIFS or EIFS-DIFS+AIFS[AC] is defined to provide a time sufficient for another STA to transmit an ACK in response to a frame. That is, because a frame for the other STA has been received wrongly on the part of the STA using the EIFS or EIFS-DIFS+AIFS[AC], it may be said that the STA waits for a time enough for another STA to transmit an ACK before the STA starts its transmission. Upon receipt of an error-free frame during the EIFS or EIFS-DIFS+AIFS [AC], the medium is resynchronized to a busy or idle state and thus the EIFS or EIFS-DIFS+AIFS[AC] is terminated. After receiving the corresponding frame, the STA may resume medium access (using an appropriate one between a DIFS and an AIFS and when needed, by backoff). Upon expiration or termination of the EIFS or EIFS-DIFS+AIFS [AC], the STA may control medium access by using a NAV and physical carrier sensing.

The PHY-DATA.indication primitive indicates data transfer from the PHY layer to the local MAC entity. This primitive provides the parameters listed in [Table 4] below.

TABLE 4

PHY-DATA.indication(
DATA
USER_INDEX
)

In [Table 4], the DATA parameter is an octet having a value ranging from X'00' to X'FF'.

In [Table 4], the USER_INDEX parameter may be typically set to u for a HE STA. The USER_INDEX parameter exists for an MU PPDU (e.g., HE UPLINK OFDMA PPDU, HE DOWNLINK OFDMA PPDU, HE UPLINK MU PPDU, or HE DOWNLINK MU PPDU), indicating the index of a user in RXVECTOR to which the DATA octet is applied. Otherwise, USER_INDEX may not be included.

The PHY-DATA.indication primitive may be generated for a receiving PHY entity to transmit an octet of received data to the local MAC entity. The time between a reception time of the last bit of the last octet provided on a radio medium and a reception time of the PHY-DATA.indication primitive at the MAC entity may correspond to a delay time for processing at the PHY layer, expressed as aRxPHYDelay.

A channel access procedure of third-party STAs in the example of FIG. 18 will be described based on the aforedescribed PHY-RXEND.indication primitive and PHY-DATA.indication primitive.

As in the example of FIG. 14, STA1 transmits an RTS PPDU to the AP, the AP transmits a CTS PPDU including a list of STA1, STA2, STA3, and STA4, each STA transmits a DATA PPDU on its allocated subchannel in MU-MIMO or OFDMA, and the AP transmits a block ACK PPDU to STA1, STA2, STA3, and STA4 across total subchannels (i.e., on one channel) in the example of FIG. 18. Thus, a redundant description is not provided herein Since third-party STA5 has not received the PLCP headers of DATA PPDUs successfully from STA2, STA3, and STA4 (i.e., in view of a reception error), third-party STA1 may notify the MAC layer of error generation by setting the status information of RXERROR to indicate error generation in the PHY-RXEND.indication primitive (for example, by setting a value other than NoError. Meanwhile, as third-party STA5 successfully receives a DATA PPDU from STA1 (i.e., STA1 being one of the non-AP STAs in FIG. 18), third-party STA1 may set USER_INDEX to a value indicating STA1 (i.e., STA1 being one of the non-AP STAs in FIG. 18) in a PHY-DATA.indication primitive and transmit octet information of the received PSDU to the MAC layer. Subsequently, after transmission of the PPDU is completed, third-party STA5 may perform IFS processing by setting an IFS for the next channel access to the DIFS.

In a legacy WLAN (e.g., a system conforming to a standard such as IEEE 802.11b/g/n/ac/ad/af/ah), if the PHY layer reports a PHY-RXEND.indication primitive with status information of RXERROR to a value indicating error generation (e.g., a value other than NoError), the IFS is set to an EIFS, for the next channel access. Compared to this operation of the legacy STA, third-party STA5 may attempt the next channel access based on the DIFS, instead of the EIFS in the present invention.

This is because although third-party STA5 has failed to receive the PLCP headers of DATA PPDUs from STA2, STA3, and STA4 and thus reports a PHY-RXEND.indication primitive with RXERROR set to a value indicating error generation to the MAC layer, third-party STA1 has successfully received a DATA PPDU from STA1 and may perform virtual carrier sensing by normally setting a NAV based on the received DATA PPDU.

If third-party STA5 has received the DATA PPDU from STA1 with an error, third-party STA5 may use the EIFS when attempting the next channel access (this may correspond to an operation of third-party STA6 described later in the example of FIG. 18).

That is, when a legacy STA successfully receives a frame without an error (e.g., the PHY-RXEND.indication primitive does not indicate error generation), the legacy STA uses the DIFS. On the other hand, when the legacy STA fails to receive a frame (e.g., the PHY-RXEND.indication primitive indicates error generation), the legacy STA uses the EIFS. However, even though a reception error occurs in a frame on some subchannel, as far as an STA successfully receives a frame without an error on at least one subchannel, the STA may use the DIFS instead of the EIFS in the present invention.

As third-party STA5 fails to receive the PLCP headers of DATA PPDUs from STA1, STA2, STA3, and STA4 (i.e., due to a reception error), third-party STA1 may transmit a PHY-RXEND.indication primitive with status information of RXERROR set to a value indicating error generation (e.g., a value other than NoError) to the MAC layer. Then, after transmission of the PPDUs is completed, third-party STA6 may perform IFS processing by setting the IFS for the next channel access to the EIFS.

That is, if error generation is reported for all users (or all subchannels) by status information of RXERROR of a PHY-RXEND.indication primitive for a frame received at a third-party STA, the third-party STA may attempt the next channel access procedure using the EIFS.

According to an embodiment of the present invention, in order to support the above operation, subchannel identification information or user identification information (e.g., USER_INDEX) is added to the RXVECTOR parameter of the PHY-RXEND.indication reported to the MAC layer by the PHY layer. Thus, the MAC layer may determine from the PHY-RXEND.indication primitive reported by the PHY layer whether there are errors for all users (or all subchannels). In the absence of an error for at least one user (or at least one subchannel), the DIFS is set for the next medium access. In the presence of errors for all users (or all subchannels), the EIFS may be set for the next medium access.

While a channel access procedure of third-party STAs is shown in FIG. 18 as performed based on the PHY-RXEND-.indication primitive and the PHY-DATA.indication primitive, the same channel access scheme may also be performed for a destination STA of a HE MU PPDU frame (i.e., not an overhearing third-party STA but an intended receiving STA).

For example, it is assumed that a destination STA of HE MU PPDUs transmitted by STA1, STA2, STA3, and STA4 is an AP.

As the AP fails to receive the PLCP headers of DATA PPDUs from STA2, STA3, and STA4, the AP may provide a PHY-RXEND.indication primitive with status information of RXERROR set to a value indicating error generation (e.g., a value other than NoError) to the MAC layer. On the other hand, as the AP successfully receives a PSDU of a DATA PPDU from STA1, the AP may set USER_INDEX of a PHY-DATA.indication primitive to STA1 and provide octet information of the PSDU to the MAC layer. Then, after transmission of the PPDU is completed, the AP may set the IFS to the DIFS, for the next channel access.

Meanwhile, as the AP fails to receive the PLCP headers of the DATA PPDUs from STA2, STA3, and STA4, the AP may provide the PHY-RXEND.indication primitive with status information of RXERROR set to a value indicating error generation (e.g., a value other than NoError) to the MAC layer. Then, after transmission of the PPDUs is completed, the AP may set the IFS to the EIFS, for the next channel access.

As described above, information such as USER_INDEX (i.e., a parameter indicating whether a reception error has occurred for each subchannel or each user) may be added to the PHY-RXEND.indication primitive in an embodiment of the present invention. Therefore, if a data frame is successfully received from at least one STA (or on at least one subchannel) among data frames (e.g., HE MU PPDU frames) transmitted simultaneously by a plurality of STAs, it may be determined that data frames have been successfully received from all users (or on all subchannels) and an IFS value may be set (e.g., to the DIFS), for the next channel access. If none of the data frames have been received successfully from all STAs (or on all subchannels), an IFS value is set (e.g., to the EIFS) for the next channel access, as in the case of a frame reception error.

FIG. 19 depicts an exemplary rate selection for response frames according to the present invention.

A second frame may be transmitted in response to a first frame. For example, one or more STAs may transmit UL frames to an AP and the AP may transmit DL ACK frames or DL block ACK frames to the one or more STAs in response to the UL frames. Or the AP may transmit a DL frame to one or more STAs and the one or more STAs may transmit ACK frames or block ACK frames in response to the DL frame. Or one or more STAs may transmit RTS frames to the AP and the AP may transmit CTS frames to the one or more STAs in response to the RTS frames. Or the AP may transmit RTS frames to one or more STAs and the one or more STAs may transmit CTS frames in response to the RTS frames. Or the AP may transmit a trigger frame including scheduling information for UL transmission to a plurality of STAs and the plurality of STAs may transmit a UL MU frame in response to the trigger frame.

As described above, the first frame may be a frame eliciting the second frame and the second frame may be a response frame to the first frame. The rate of the second frame may be determined in a different manner according to the type of the second frame according to the present invention. A first type and a second type may be defined for the second frame and may correspond to a Single User (SU) type and a Multi-User (MU) type, respectively.

Further, the first and second types of the second frame may be defined according to transmission schemes or access schemes. For example, the first and second types may correspond to a single transmitter type and a multiple transmitter type, respectively. Or the first and second types may corresponding to a non-OFDMA type and an OFDMA type, respectively. Or the second type may correspond to the MU type or a multiple user type, and the first type may correspond to any other type than the second type.

Also, the type of the second frame may be determined based on information included in the first frame eliciting the second frame. For example, if the first frame is a frame including information eliciting a UL MU transmission (e.g., a frame triggering a UL transmission), the second frame may be of the second type, and otherwise, the second frame may be of the first type.

Further, a rate may correspond to an MCS in the present invention. Specifically, a rate may be determined to be X Mb/s (X=6, 9, 12, 18, 24, 36, 48, 54, . . . ) according to a combination of a modulation class (e.g., BPSK, QPSK, 16-QAM, 64-QAM, 256-QAM, . . . ) and a coding rate (e.g., 1/2, 3/4, 5/6, . . . ).

First, rate selection for the second frame in the case where the second frame is of the first type (e.g., the SU type) will be described below.

If a CTS or ACK frame is included in a PPDU (e.g., a non-HT PPDU), a primary rate for the CTS or ACK frame may be defined to be a highest rate within a BSSBasicRateSet parameter, equal to or lower than the rate of a previous frame (or a non-HT reference rate) (the BSSBasicRateSet parameter is a set of data rates that should be supported by all STAs joining a BSS). If no rate in the BSSBasicRateSet parameter satisfies the above condition, the primary rate may be defined to be a highest mandatory rate of the PHY layer, equal to or lower than the rate of the previous frame (or the non-HT reference rate). An STA may select an alternative rate. The STA may transmit a non-HT PPDU CTS or ACK frame according to the primary rate or the alternative rate (in the presence of one of the primary rate and the alternative rate).

If a block ACK frame is transmitted in a non-HT PPDU, in immediate response to an implicit block ACK request or block ACK request frame include in a HE or VHT PPDU, a primary rate may be defined to be a highest rate within the BSSBasicRateSet parameter, equal to or lower than the rate of a previous frame (or a non-HT reference rate). If no rate in the BSSBasicRateSet parameter satisfies the above condition, the primary rate may be defined to be a highest mandatory rate of the PHY layer, equal to or lower than the rate of the previous frame (or the non-HT reference rate). An STA may select an alternative rate. The STA may transmit a non-HT PPDU block ACK frame according to the primary rate or the alternative rate (in the presence of one of the primary rate and the alternative rate).

If a basic block ACK frame is transmitted in a non-HT PPDU in immediate response to a block ACK request frame included in a non-HT PPDU, a primary rate may be defined as the same rate and modulation class as the block ACK request frame, and an STA may transmit the basic block ACK frame at the primary rate.

If a frame eliciting a response is included in a HT or VHT frame, a maximum-rate MCS or an <MCS, NSS> tuple of CandidateMCSSet may be determined, in which the modulation value of each stream is equal to or lower than the modulation value of each stream of the MCS of a received frame and a coding rate is equal to or lower than the coding rate of the MCS of the received frame (CandidateMCSSet may be determined in consideration of the BSSBasicMCSSet parameter and a setting for MCSs supported for $N_{SS}$ (=1, 2, 3, 4, 5, 6, 7, or 8). This MCS or <MCS, NSS> tuple may be a primary MCS for transmission of a response. Also, mapping of an MCS or <MCS, NSS> tuple to a modulation and coding rate may be determined by the PHY.

As described above, if the second frame elicited by the first frame is a control response frame of the first type (e.g., the SU type), its rate (or MCS) may be determined based on the rate (or MCS) of the first frame and BSSBasicRateSet (or CandidateMCSSet). That is, a highest rate (or MCS) of BSSBasicRateSet (or CandidateMCSSet) which is a set of rates (or MCSs) supported commonly in a BSS, equal to or lower than the rate (or MCS) of the first frame may be selected as the rate (or MCS) of the second frame.

Now, a description will be given of rate selection for the second frame in the case where the second frame is of the second type (e.g., the MU type).

Referring to FIG. 19 again, the AP may transmit a plurality of data units simultaneously to a plurality of STAs on a 40-MHz channel. Transmission of an RTS and a CTS, OFDMA transmission of DATA PPDUs to STA1 to STA4, and frame exchange such as exchange of block ACK PPDUs and block ACK request PPDUs on a first 20-MHz channel are performed in the same manner as in the example of FIG. 17 and thus a redundant description will be avoided herein. Transmission of an RTS and a CTS, OFDMA transmission of DATA PPDUs to STA1 to STA4, and frame exchange such as exchange of block ACK PPDUs and block ACK request PPDUs on a second 20-MHz channel are performed in the same manner as on the first 20-MHz channel, except that STA5 to STA8 are involved and thus a redundant description will be avoided herein.

The ACK policy of a DATA PPDU may be set to Implicit Block ACK Request for one destination STA on each of the 20-MHz channels (e.g., for STA1 on the first 20-MHz channel and STA5 on the first 20-MHz channel). Accordingly, collision caused by simultaneous transmission of block ACK PPDUs on one 20-MHz channel from a plurality of STAs can be prevented and the block ACK PPDUs may be transmitted sequentially in time.

In the example of FIG. 19, it is assumed that the MCS values of DATA PPDUs for STA1, STA2, STAT, and STA8 are set to MCS_low and the MCS values of DATA PPDUs for STA3, STA4, STA5, and STA6 are set to MCS_high. If MU transmission of a plurality of DATA PPDUs is completed, each of destination STAs (i.e., STA1 and STA5) of DATA PPDUs with the ACK policy set to Implicit Block ACK Request may transmit a block ACK PPDU corresponding to a control response frame on a 20-MHz channel.

The DATA PPDUs transmitted to the plurality of STAs and the block ACK PPDUs transmitted in response to the DATA PPDUs correspond to first frames and second frames, respectively in the present invention. Further, since STA1 and STA5 simultaneously transmit block ACK PPDUs on two 20-MHz channels, the type of the second frames is of the second type (i.e., the MU type).

In the example of FIG. 19, the MCS values of the block ACK PPDUs transmitted by STA1 and STA5 are set to MCS_low. For STA1, the AP has set the MCS value of the DATA PPDU transmitted to STA1 to MCS_low and thus the MCS value of a control response frame to the DTA PPDU is also MCS_low. This may be the same in effect as rate selection for a second frame of the first type (it is assumed that the BSSBasicRateSet or CandidateMCSSet parameter includes both MCS_high and MCS_low). Meanwhile, for STA5, the AP has set the MCS value of the DATA PPDU transmitted to STA5 to MCS_high. If the rate selection scheme for the second frame of the first type is still used, the MCS value of a control response frame to the DTA PPDU should be determined to be MCS_high. However, in the case of the second frame of the second type, the MCS value of the second frame transmitted by STA5 is set to not MCS_high but MCS_low in the example of FIG. 19. This is because rate selection for a second frame of the second type is based on a parameter different from a parameter based on which rate (or MCS) selection for a second frame of the first type is performed.

As described above, the rate (or MCS) of a second frame elicited by a first frame may be determined or selected based on a different parameter depending on the type of the second frame. For example, if the second frame is of the first type (e.g., the SU type), the rate (or MCS) of the second frame may be determined based on a first parameter (e.g., a rate (or MCS) limit for SU transmission). If the second frame is of the second type (e.g., the MU type), the rate (or MCS) of the second frame may be determined based on a second parameter (e.g., a rate (or MCS) limit for MU transmission). The first parameter or the second parameter may be applied according to the first type (or the SU type) or the second type (or the MU type) according to the present invention, without determining whether the second frame is a control frame (or a control response frame) or a data frame.

For example, the first parameter may include one or more of a rate or MCS of a first frame, a basic rate or MCS set (e.g., BSSBasicRateSet or CandidateMCSSet) configured in a BSS, a rate or MCS limit for a single transmitted frame, and a supported MCS and NSS set (for SU transmission or except for MU transmission).

For example, the second parameter may include one or more of a rate or MCS of a second frame, the basic rate or MCS set (e.g., BSSBasicRateSet or CandidateMCSSet) configured in the BSS, a rate or MCS limit for a frame transmitted simultaneously with other frames, or a supported MCS and NSS set (for MU transmission or except for SU transmission).

For example, a highest rate (or MCS) in the basic rate (or MCS) set configured by the BSS, equal to or lower than the rate (or MCS) of a first frame eliciting a second frames may be determined for each of simultaneously transmitted second frames, and a lowest of the determined rates (or MCSs) may be applied commonly to all of the second frames.

Or the second parameter may be a parameter indicating a separately configured (or indicated) rate (or MCS), not a parameter determined based on the rate (or MCS) of the first frame or the basic rate (or MCS) set configured in the BSS.

Parameters included in the first parameter or the second parameter may be preset in a management frame (e.g., a beacon frame, a probe response frame, an association response frame, a re-association response frame, etc.) by the AP or dynamically configured in the first frame by the AP.

Also, the second parameter may be set to the lowest of the rate (or MCS) of the first frame eliciting the second frame, transmitted by a first STA and the rates (or MCSs) of one or more other first frames eliciting one or more other second frames, transmitted by one or more other STAs. Or the second parameter may be set to the lowest of rates (or MCs) applied to simultaneously transmitted frames. Further, the second parameter may be set to a value that aligns the transmission times (or time-domain durations) of simultaneously transmitted frames. Therefore, the transmission times of the second frames simultaneously transmitted by STAT and STA5 may be aligned in the example of FIG. 19. As in the example of FIG. 19, since the transmission times of the second frames (i.e. block ACK PPDUs) transmitted by the plurality of STAs are aligned, new subsequent PPDUs (or block ACK PPDUs) may be transmitted continuously at the same time.

In the example of FIG. 19, to receive block ACK PPDUs from STA2 and STA6, the AP may transmit block ACK request PPDUs to the plurality of STAs (e.g., STA2 and STA6). For example, the AP may transmit the block ACK request PPDUs to STA2 and STA6 on the respective 20-MHz channels. The rates (or MCSs) of the block ACK request PPDUs may be set to the same value (i.e., MCS_low) and thus the transmission times of the block ACK request PPDUs may be aligned. If the second parameter based on which rates (or MCSs) are selected for the block ACK PPDUs transmitted by STA2 and STA6 includes the rates (or MCSs) of the first frames (i.e., the block ACK request frames), the MCSs of the second frames may be set to MCS_low according to MCS_low of the first frames (or the lowest MCS_low of the rates (or MCSs) of the first frames). Or the second parameter for selection of the rates (or MCSs) of the second frames may be included in the first frames, separately from the rates (or MCSs) of the first frames (i.e., the block ACK request frames).

FIG. 20 depicts another exemplary rate selection for response frames according to the present invention.

Although the example of FIG. 20 is basically similar to the example of FIG. 19, the rates (or MCSs) of first frames eliciting simultaneously transmitted second frames are set to be as equal or similar as possible in FIG. 20, on the assumption that the rates (or MCSs) of the second frames are determined based on the rates (or MCSs) of the first frames. As a consequence, since the rates (or MCSs) of the second frames which are elicited by the first frames and simultaneously transmitted are equal or not much different, the transmission times of the second frames may also be equal or similar.

In the example of FIG. 20, the AP may transmit block ACK requests in such a manner that STA pairs (STA1, STA7), (STA2, STA8), (STA3, STA5), and (STA4, STA6) may be requested to transmit block ACK PPDUs simultaneously. That is, the ACK policy may be set to Implicit Block ACK Request for DATA PPDUs of STA1 and STA7 for which MCS_low is set. Thus, STA1 and STA7 may transmit block ACK PPDUs at MCS_low. Then, STA2 and STA8 may transmit block ACK PPDUs at MCS_low in response to block ACK request PPDUs with MCS_low set for STA2 and STA8. STA3 and STA5 may transmit block ACK PPDUs at MCS_high in response to block ACK request PPDUs with MCS_high set for STA3 and STA6. STA4 and STA6 may transmit block ACK PPDUs at MCS_high in response to block ACK request PPDUs with MCS_high set for STA4 and STA6. Compared to the example of FIG. 19 in which MCS_low is selected as the MCS values of all block ACK PPDUs, the MCSs of some block ACK PPDUs may be set to MCS_high in FIG. 20, thereby improving total system performance.

FIG. 21 illustrates another exemplary rate selection for response frames according to the present invention.

In the example of FIG. 21, the AP may transmit a plurality of data units simultaneously to STA1 to STA8 on a 40-MHz channel. Transmission of an RTS and a CTS, and frame exchange such as OFDMA transmission of DATA PPDUs to STA1 to STA4 and OFDMA transmission of block ACK PPDUs from STA1 to STA4 on a first 20-MHz channel are performed in the same manner as in the example of FIG. 15 and thus a redundant description will be avoided herein. Transmission of an RTS and a CTS, and frame exchange such as OFDMA transmission of DATA PPDUs to STA5 to STA8 and OFDMA transmission of block ACK PPDUs from STA5 to STA8 on a second 20-MHz channel are performed in the same manner as on the first 20-MHz channel, except that STA5 to STA8 are involved and thus a redundant description will be avoided herein.

In the example of FIG. 21, when a 5-MHz subchannel is allocated to each of STA1 to STA8 and the AP transmits DATA PPDUs simultaneously to STA1 to STA8 on the allocated subchannels, the AP may set all of the ACK policies of the DATA PPDUs to Implicit Block ACK Request. Therefore, as the plurality of STAs transmit block ACK PPDUs on their allocated subchannels (or subchannels on which they have received the DATA PPDUs), collision may be prevented between the block ACK PPDUs.

The lowest of the rates (or MCSs) of the simultaneously transmitted second frames (i.e., the block ACK PPDUs) may be applied commonly to the second frames. In the example of FIG. 21, if the rates (or MCSs) of the second frames are determined based on the rates (or MCSs) of the first frames eliciting the second frames, MCS_low, MCS_low, MCS_high, MCS_high, MCS_high, MCS_high, MCS_high, and MCS_high may be selected as the respective MCSs of the block ACK PPDUs. In contrast, the lowest MCS_low of the rates (or MCSs) of the second frames may be applied commonly to all of the second frames according to the present invention. This rate (or MCS) selection for the second frames may be based on a second parameter included in the first frames or preset by the AP.

FIGS. 22 and 23 illustrate formats of a HE Capabilities element according to the present invention.

In the present invention, constraints may be imposed on rate (or MCS) selection of STAs participating in MU transmission (e.g., MU-MIMO transmission or OFDMA transmission) by a HE Capabilities element. That is, parameters included in a first parameter based on which the rate (or MCS) of a second frame of the first type (i.e., the SU type) and parameters included in a second parameter based on which the rate (or MCS) of a second frame of the second type (i.e., the MU type) may be provided to an STA that transmits a second frame, using the HE Capabilities element of the present invention The HE Capabilities element may be provided preliminarily to an STA(s) in a management frame (e.g., a beacon frame, a probe response frame, an association response frame, a re-association response frame, etc.) or in a first frame by the AP.

In FIG. 22, an Element ID field may be set to a value indicating the HE Capabilities element.

A Length field may be set to a value (e.g., in octets) indicating the length of fields following the Length field (i.e., the length of HE Capabilities Info and Supported HE-MCS and NSS Set fields).

The HE Capabilities Info field may include information about various capabilities related to a HE operation (e.g., a maximum MPDU length, a supported channel bandwidth set, etc.).

The Supported HE-MCS and NSS Set field may include information about combinations of HE-MCSs and numbers of spatial streams $N_{SS}$ that STAs support for reception and transmission (i.e., an Rx/Tx HE-MCS Map subfield), information about a highest supported long GI data rate (i.e., an Rx/Tx Highest Supported Long GI Data Rate subfield), etc.

The Rx HE-MCS Map field may include Max HE-MCS for n SS fields (n=1, 2, 3, 4, 5, 6, 7, 8, . . . ).

One Max HE-MCS for n SS field may be 2 bits long. If this field is set to 0, this may indicate that HE-MCS 0 to HE-MCS 7 are supported for n spatial streams. If this field is set to 1, this may indicate that HE-MCS 0 to HE-MCS 8 are supported for n spatial streams. If this field is set to 2, this may indicate that HE-MCS 0 to HE-MCS 9 are supported for n spatial streams. If this field is set to 3, this may indicate that n spatial streams are not supported.

Upon receipt of the HE Capabilities element, an STA may determine a HE-MCS value that the AP supports in receiving n spatial streams. Therefore, the STA may determine a HE-MCS and $N_{SS}$ for a PPDU to be transmitted to the AP.

As described below, a HE-MCS and NSS set supported in reception of a HE-STA may be determined for each <HE-MCS, NSS> tuple from the Supported HE-MCS and NSS Set field (NSS=1, 2, 3, 4, 5, 6, 7, 8 and a bandwidth is 20 MHz, 40 MHz, 80 MHz, 160 MHz, or 80+80 MHz).

If support of a specific HE-MCS for NSS spatial streams in a bandwidth is mandatory, a corresponding <HE-MCS, NSS> is supported in the bandwidth, in the reception of the HE-STA.

Otherwise, a Max HE-MCS For n SS field of the Rx HE-MCS Map field indicates support for n=NSS. If the Rx Highest Supported Long GI Data Rate subfield is set to 0, a corresponding <HE-MCS, NSS> tuple is supported in a corresponding bandwidth during reception at the HE-STA.

Otherwise, the Max HE-MCS For n SS field of the Rx HE-MCS Map field indicates support for n=NSS. If a data rate (expressed as a largest integer in Mb/b equal to or lower than an actual data rate) for a long GI of an MCS for NSS spatial streams in a corresponding bandwidth is equal to or lower than a rate indicated by the Rx Highest Supported Long GI Data Rate subfield, a corresponding <HE-MCS, NSS> tuple is supported in a corresponding bandwidth during reception at the HE-STA.

Otherwise, a corresponding <HE-MCS, NSS> tuple is not supported in a corresponding bandwidth during reception at the HE-STA.

Further, if the used <HE-MCS, NSS> tuple and bandwidth is not included in the Rx Supported HE-MCS and NSS Set field of a receiving STA(s), the HE STA may not transmit a HE PPDU. However, in a special case in which allowed use of the <HE-MCS, NSS> tuple in the bandwidth is made clear, the HE-STA may transmit the HE PPDU using the <HE-MCS, NSS> in the bandwidth.

Information indicated by the Rx HE-MCS Map field in FIG. 22 may correspond to the first parameter (e.g., a parameter used for determining a rate (or MCS) for a second frame of the first type (i.e., the SU type) in the foregoing example. Meanwhile, it is necessary to set the second parameter (e.g., a parameter used for determining a rate (or MCS) for a second frame of the second type (i.e., the MU type) to be different from the Rx HE-MCS Map field (or the first parameter).

For example, it is assumed that when the AP receives a UL MU transmission from a plurality of STAs, the AP may receive up to M spatial streams from each STA and the total number of spatial streams that the AP may receive is N (N>M).

It may be assumed that in the case where the AP receives M spatial streams in a UL SU PPDU from only one STA, a maximum decoding performance is K bps. That is, an allowed maximum rate for a UL SU transmission may be K bps.

In the case where the AP receives N spatial streams simultaneously in a UL MU PPDU from a plurality of STAs, the decoding performance of the AP should be K/M*N in order to support the same rate as for transmission of a UL SU PPDU for each STA. Since N>M, the AP should have a high decoding performance in order to receive a UL MU transmission, relative to reception of a UL SU transmission from an STA. In this case, the implementation complexity of the AP is significantly increased. Thus, to minimize the increase of the implementation complexity of the AP and increase the gain of a UL MU transmission, different K values (i.e., values corresponding to supported HE-MCS and NSS sets of the AP) may be set for SU transmission and MU transmission.

For example, if M=4 and N=8, the K value for UL SU transmission (i.e., a HE-MCS and NSS set supported for UL SU PPDU reception) may be set to 2 Gbps and the K value for UL MU transmission (i.e., a HE-MCS and NSS set supported for UL MU PPDU reception) may be set to 1 Gbps.

Therefore, as illustrated in the exemplary format of the HE Capabilities element in FIG. 23, a field corresponding to the Rx HE-MCS Map field of FIG. 22 may be defined as an Rx HE-MCS Map field for UL SU transmission (or except for UL MU transmission) and an additional Rx HE-MCS Map field for UL MU transmission, that is, an Rx HE-MCS Map for Uplink MU Tx field may be defined. That is, the Rx HE-MCS Map subfield of the Supported HE-MCS and NSS Set field may be signaled as two separate parameters for reception of a UL SU transmission (e.g., corresponding to a first parameter) and reception of a UL MU transmission (e.g., corresponding to a second parameter).

Upon receipt of the separate Supported HE-MCS and NSS Set information for UL SU transmission and UL MU transmission from the AP, an STA may apply a rate (or MCS) determined based on a different parameter (e.g., the first parameter or the second parameter) according to the type (e.g., the first type (i.e., the SU type) or the second type (i.e., the MU type)) of a frame (e.g., a second frame) to be transmitted for UL transmission.

Information about Supported HE-MCS and NSS Set included in the HE Capabilities element as described before with reference to FIGS. 22 and 23 may be included in a HE Operation element. Or the information about Supported HE-MCS and NSS Set may be provided in a management frame (e.g., a beacon frame, a probe response frame, an association response frame, a re-association frame, etc.) or in a first frame (e.g., a fame triggering UL MU transmission or a UL MU transmission polling frame) eliciting a second frame (i.e., a frame for which a rate 9 or MCS) is determined based on information about Supported HE-MCS and NSS Set).

Further, although an available rate (or MCS) range is set for an STA, for example, by Supported HE-MCS and NSS Set and the STA may select a rate (or MCS) within the range (i.e., without exceeding a maximum value), a specific rate (or MCS) for a second frame may be indicated by a first frame.

While it has been described in the forgoing example of the present invention that Supported HE-MCS and NSS Set is used as an example of a first parameter or a second parameter, this does not limit the scope of the present invention. Examples of using other types of parameters that limit or indicate a transmission rate (or MCS) for a second frame elicited by a first frame are all included.

These other types of parameters may include, for example, the number of encodes (e.g., the number of Binary Convolutional Code (BCC) encoders). For example, if one BCC encoder supports 600 Mbps, the number of BCC encoders for SU transmission (e.g., a value of the first parameter) is set to 4, and the number of BCC encoders for MU transmission (e.g., a value of the second parameter) is set to 2, this may mean that 2.4 Gbps is supported or indicated for SU transmission and 1.2 Gbps is supported or indicated for MU transmission. Accordingly, the STA may select an MCS except for an MCS for which the number of BCC encoders exceed 4 or apply an MCS corresponding to four BCC encoders, for SU transmission, whereas the STA may select an MCS except for an MCS for which the number of BCC encoders exceed 2 or apply an MCS corresponding to two BCC encoders, for MU transmission.

As described above, the rate (or MCS) of a second frame elicited by a first frame may be determined based on a different parameter, that is, a first or second parameter according to the type of the second frame (e.g., the first type corresponding to SU transmission or the second type corresponding to MU transmission) in the present invention. Therefore, in the case of MU transmission, the lengths of a plurality of simultaneously transmitted second frames may be made equal or a receiver may appropriately process the plurality of simultaneously transmitted second frames.

Figure 24:
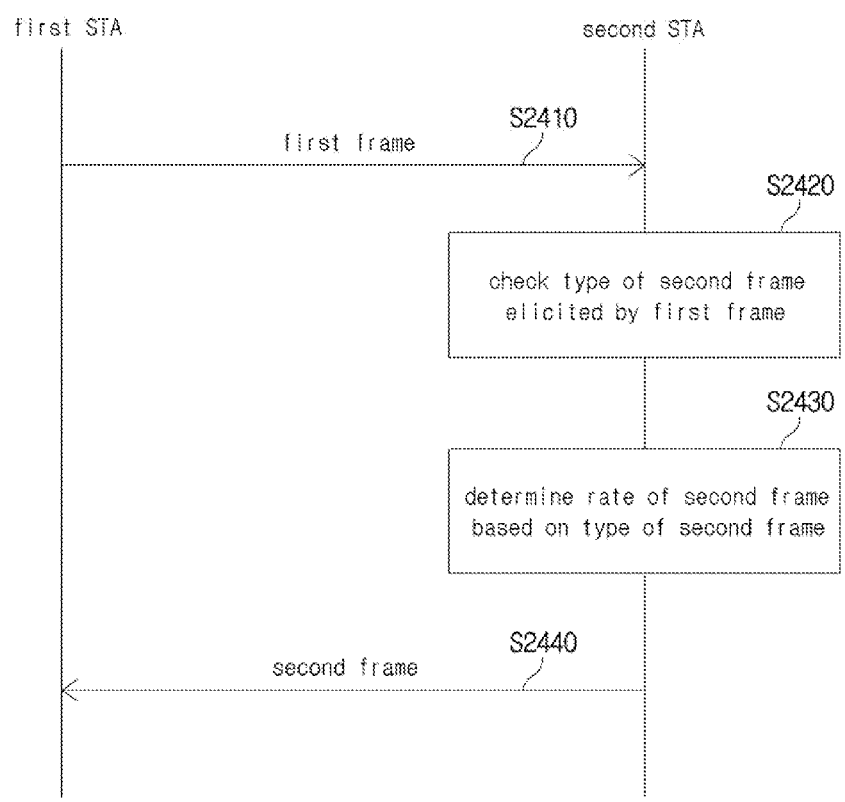
FIG. 24 is a flowchart illustrating an exemplary method according to the present invention.

FIG. 24 is a flowchart illustrating an exemplary method according to the present invention.

In step S2410, a first STA may transmit a first frame eliciting a second frame to a second STA, and the second STA may prepare to transmit a second frame, upon receipt of the first frame from the first STA.

In step S2420, the second STA may check the type of the second frame elicited by the first frame (the first type corresponding to SU transmission or the second type corresponding to MU transmission).

In step S2430, the second STA may determine a rate for the second frame based on the checked type of the second frame.

If the second frame corresponds to the first type, the second STA may determine the rate of the second frame based on the rate of the first frame and BSS basic rate set information. For example, a highest rate in the BSS basic rate set information, which is equal to or lower than the rate of the first frame may be determined to the rate of the second frame. In addition, MCS and NSS set information supported for transmission of the first type and information about the number of encoders supported for transmission of the first type may be considered in determining the rate of the second frame.

If the second frame corresponds to the second type, the second STA may transmit the second frame to the first STA simultaneously with one or other frames from one or other STAs. In this case, a rate that makes the lengths of the second frame and the one or other frames equal may be applied to the second frame. Further, the same rate may be determined for the second frame and the one or other frames. In this manner, a rate applied to a second frame of the second type may be determined based on one or more of information about a rate or MCS limit on transmission of the second type, a rate of a dl frame, BSS basic rate set information, supported MSC and NSS set information for transmission of the second type, and information about the number of encoders supported for transmission of the second type.

In step S2440, the second STA may transmit a second frame at a rate determined based on the type of the second frame elicited by the first frame to the first STA, and the first STA may receive the second frame at the rate determined based on the type of the second frame from the second STA.

While the exemplary method has been described with reference to FIG. 24 as a series of operations for simplicity of description, this does not limit the sequence of steps. When needed, steps may be performed at the same time or in a different sequence. All of the exemplary steps are not always necessary to implement the method according to the present invention.

The foregoing embodiments of the present invention may be implemented independently or one or more of the embodiments may be implemented simultaneously, for the method of FIG. 24.

The present invention includes an apparatus for processing or performing the method according to the present invention (e.g., the wireless device and its components described with reference to FIGS. 1, 2, and 3).

The present invention includes software (an operating system (OS), an application, firmware, a program, etc.) for executing the method according to the present invention in a device or a computer, and a medium storing the software that can be executed in a device or a computer.

While various embodiments of the present invention have been described in the context of an IEEE 802.11 system, they are applicable to various mobile communication systems.

What is claimed is:

1. A method for receiving one or more uplink frames from one or more stations by an Access Point (AP) in a Wireless Local Area Network (WLAN), the method comprising:
   transmitting, a first Modulation and Coding Scheme (MCS) map field for uplink single-user transmission and a second MCS map field for uplink multi-user transmission, the second MCS map field including a plurality of subfields, wherein the plurality of subfields respectively corresponds to a plurality of spatial stream numbers, and each sub-field indicates a maximum MCS for a corresponding spatial stream number;
   transmitting, to the one or more stations, a downlink frame eliciting the one or more uplink frames; and
   receiving the one or more uplink frames from the one or more stations, each uplink frame having a coding rate determined based on whether the downlink frame elicits multiple uplink frames to be simultaneously transmitted from multiple stations to the AP or a single uplink frame to be transmitted from a single station to the AP,
   wherein the coding rate is determined based on the first MCS map field when the downlink frame elicits the single uplink frame, and
   wherein the coding rate is determined based on the second MCS map field when the downlink frame elicits the multiple uplink frames.

2. The method according to claim 1, wherein the receiving the one or more uplink frames from the one or more stations comprises:
   when the downlink frame elicits the multiple uplink frames, receiving the multiple uplink frames, each uplink frame having a coding rate determined so that lengths of the multiple uplink frames are equal to each other.

3. The method according to claim 1, wherein when the downlink frame elicits the multiple uplink frames, coding rates of the multiple uplink frames are equal to each other.

4. The method according to claim 1, wherein the receiving the one or more uplink frames from the one or more stations comprises:
   when the downlink frame elicits the single uplink frame, receiving the single uplink frame having a coding rate determined based on a coding rate of the downlink frame and Basic Service Set (BSS) basic rate set information.

5. The method according to claim 4, wherein the receiving the one or more uplink frames from the one or more stations comprises:
   when the downlink frame elicits the single uplink frame, receiving the single uplink frame having a highest coding rate of the BSS basic rate set information, equal to or lower than the coding rate of the downlink frame.

6. The method according to claim 4, wherein the receiving the one or more uplink frames from the one or more stations comprises:
   when the downlink frame elicits the single uplink frame, receiving the single uplink frame having a coding rate determined further based on Modulation and Coding Scheme (MCS) and Number of Spatial Streams (NSS) set information supported for transmission of the single uplink frame, and information about a number of encoders supported for transmission of the single uplink frame.

7. The method according to claim 1, wherein the downlink frame is a trigger frame including scheduling information for transmission of the one or more uplink frames.

8. The method according to claim 1, wherein the downlink frame is a data frame and the one or more uplink frames are control response frames.

9. The method according to claim 1, wherein the receiving the one or more uplink frames from the one or more stations comprises:
   when the downlink frame elicits the multiple uplink frames, receiving the multiple uplink frames, each uplink frame having a coding rate determined based on one or more of information about a coding rate or MCS limit on transmission of the multiple uplink frames, a rate of the downlink frame, BSS basic rate set information, MCS and NSS set information supported for transmission of the multiple uplink frames, information about a number of encoders supported for transmission of the multiple uplink frames.

10. A method for transmitting an uplink frame to an Access Point (AP) by a Station (STA) in a Wireless Local Area Network (WLAN), the method comprising:
    receiving, a first Modulation and Coding Scheme (MCS) map field for uplink single-user transmission and a second MCS map field for uplink multi-user transmission, the second MCS map field including a plurality of subfields, wherein the plurality of subfields respectively corresponds to a plurality of spatial stream numbers, and each sub-field indicates a maximum MCS for a corresponding spatial stream number;
    receiving, from the AP, a downlink frame eliciting one or more uplink frames;
    determining a first coding rate based on whether the downlink frame elicits multiple uplink frames to be simultaneously transmitted from multiple stations to the AP or a single uplink frame to be transmitted from a single station to the AP; and
    transmitting a first uplink frame having the first coding rate to the AP,
    wherein determining the first coding rate comprises:
      determining the first coding rate based on the first MCS map field when the downlink frame elicits the single uplink frame, and
      determining the first coding rate based on the second MCS map field when the downlink frame elicits the multiple uplink frames.

11. The method according to claim 10, wherein when the downlink frame elicits the multiple uplink frames, the first coding rate is determined so that lengths of the multiple uplink frames are equal to each other.

12. The method according to claim 10, wherein when the downlink frame elicits the multiple uplink frames, the first coding rate is determined so that coding rates of the multiple uplink frames are equal to each other.

13. The method according to claim 10, wherein when the downlink frame elicits the single uplink frame the first coding rate is determined based on a coding rate of the downlink frame and Basic Service Set (BSS) basic rate set information.

14. The method according to claim 13, wherein when the downlink frame elicits the single uplink frame the first coding rate is determined as a highest coding rate of the BSS basic rate set information, equal to or lower than the coding rate of the downlink frame.

15. The method according to claim 13, wherein
when the downlink frame elicits the single uplink frame the first coding rate is determined further based on Modulation and Coding Scheme (MCS) and Number of Spatial Streams (NSS) set information supported for transmission of the single uplink frame, information about a number of encoders supported for transmission of the single uplink frame.

16. The method according to claim 10, wherein the downlink frame is a trigger frame including scheduling information for transmission of the one or more uplink frames.

17. The method according to claim 10, wherein the downlink frame is a data frame and the one or more uplink frames are control response frames.

18. The method according to claim 17, wherein
when the downlink frame elicits the multiple uplink frames the first coding rate is determined based on one or more of information about a coding rate or MCS limit on transmission of the multiple uplink frames, a coding rate of the downlink frame, BSS basic rate set information, MCS and NSS set information supported for transmission of the multiple uplink frames, information about a number of encoders supported for transmission of the multiple uplink frames.

* * * * *